United States Patent
Fried et al.

(10) Patent No.: US 11,512,021 B2
(45) Date of Patent: Nov. 29, 2022

(54) PREVENTING OR REDUCING PLANT GROWTH BY BIOCEMENTATION

(71) Applicant: DUST BIOSOLUTIONS GMBH, Planegg (DE)

(72) Inventors: Luitpold Fried, Munich (DE); Martin Spitznagel, Munich (DE); Saskia Pazur, Eichenau (DE); Philipp Sprau, Planegg (DE)

(73) Assignee: DUST BIOSOLUTIONS GMBH, Planegg (DE)

( * ) Notice: Subject to any disclaimer, the term of this patent is extended or adjusted under 35 U.S.C. 154(b) by 0 days.

(21) Appl. No.: 16/787,673

(22) Filed: Feb. 11, 2020

(65) Prior Publication Data
US 2020/0172438 A1 Jun. 4, 2020

Related U.S. Application Data

(63) Continuation of application No. PCT/EP2019/053722, filed on Feb. 14, 2019.

(30) Foreign Application Priority Data

Feb. 14, 2018 (DE) .................. 10 2018 103 314.1

(51) Int. Cl.
*A01N 25/34* (2006.01)
*C04B 28/02* (2006.01)
*E02D 3/12* (2006.01)
*C04B 103/00* (2006.01)

(52) U.S. Cl.
CPC .............. *C04B 28/02* (2013.01); *A01N 25/34* (2013.01); *E02D 3/12* (2013.01); *C04B 2103/0001* (2013.01); *C04B 2103/0067* (2013.01)

(58) Field of Classification Search
CPC ...... A01N 25/34; C09K 17/40; C04B 22/085; C04B 22/124; C04B 22/14; C04B 22/16; C04B 24/04; C04B 24/08; C04B 24/10; C04B 24/14; C04B 24/26; C04B 24/2623; C04B 24/2641; C04B 24/2652; C04B 24/2676; C04B 24/281; C04B 24/38; C04B 24/383; C04B 24/00; C04B 28/10; C04B 40/0231; C04B 2103/001; C04B 2103/65; C04B 2103/67; C04B 2103/69
See application file for complete search history.

(56) References Cited

U.S. PATENT DOCUMENTS

| | | | |
|---|---|---|---|
| 5,332,673 A | 7/1994 | Harris et al. | |
| 7,402,623 B1* | 7/2008 | Smith | C04B 41/009 524/261 |
| 8,182,604 B2* | 5/2012 | Kucharski | C04B 28/10 106/638 |
| 9,011,855 B2* | 4/2015 | Sonderberg Frederiksen | A01N 59/00 424/139.1 |
| 2012/0137931 A1 | 6/2012 | Chattopadhyay et al. | |
| 2018/0072632 A1* | 3/2018 | Wang | C04B 40/0039 |
| 2020/0172438 A1 | 6/2020 | Fried et al. | |

FOREIGN PATENT DOCUMENTS

| | | | |
|---|---|---|---|
| CN | 101119942 A | 2/2008 | |
| CN | 105948610 A | 9/2016 | |
| EP | 3121156 A1 | 1/2017 | |
| EP | 3565792 A1 | 11/2019 | |
| EP | 3736254 A1 | 11/2020 | |
| JP | 2003047389 A | 2/2003 | |
| WO | 2006066326 A1 | 6/2006 | |
| WO | WO-2006066326 A1 | 6/2006 | |
| WO | WO-2016145190 A1 * | 9/2016 | ............ C04B 14/22 |
| WO | 2019141880 A1 | 7/2019 | |

OTHER PUBLICATIONS

Woodsman, "How to Prevent Weeds from Growing in Driveway Cracks", Nov. 14, 2017, texastreetrimmers.com, https://www.texastreetrimmers.com/prevent-weeds-from-growing-in-driveway-cracks/ (Year: 2017).*
International Search Report and Written Opinion dated May 22, 2019 for corresponding PCT Application No. PCT/EP2019/053722.
Stocks-Fischer S et al. "Microbiological precipitation of CaCO3" Soil Biology and Biochemistry, Pergamon, Oxford, GB, vol. 31, No. 11, Oct. 1, 1999 (Oct. 1, 1999), pp. 1563-1571 DOI: 10.1016/S0038-0717(99)00082-6 ISSN: 0038-0717, XP002372267.
Nemati M et al. "Modification of porous media permeability, using calcium carbonate produced enzymatically in situ" Enzyme and Microbial Technology, Stoneham, MA, US, vol. 33, No. 5, Oct. 8, 2003 (Oct. 8, 2003), pp. 635-642 DOI: 10.1016/S0141-0229(03)00191-1.
Stabnikov V et al. "Formation of water-impermeable crust on sand surface using biocement," Cement and Concrete Research, vol. 41, 2011, pp. 1143-1149.
Gomez M et al. "Field-scale bio-cementation tests to improve sands," Institution of Civil Engineers, vol. 168, 2014, pp. 206-216.
Office Action dated Sep. 25, 2018 for corresponding German Application No. DE 10 2018 1030314.1.
Chinese Office Action dated Nov. 25, 2021 for corresponding Chinese Application No. 201980019812.1.
Canadian Office Action dated Oct. 25, 2021 for corresponding Canadian Application No. 3071579.
Australian Office Action issued on Jul. 15, 2022, for corresponding Australian Application No. 2019208442.
V. Ivanov et al., "Calcite/aragonite-biocoated artificial coral reefs for marine parks," AIMS Environmental Science, vol. 4, No. 4, 2017, pp. 586-595.
J.H. Jeong et al., "Biocementation of Concrete Pavements Using Microbially Induced Calcite Precipitation," Journal of Microbiology and Biotechnology, vol. 27, No. 7, 2017, pp. 1331-1335.

* cited by examiner

*Primary Examiner* — Ali Soroush
(74) *Attorney, Agent, or Firm* — Polsinelli PC

(57) ABSTRACT

The present invention primarily relates to the use of a mixture capable of biocementation as a means of preventing or reducing plant growth, preferably weed growth. The invention also relates to a method for preventing or reducing plant growth, preferably weed growth, on/in a substrate.

20 Claims, 8 Drawing Sheets

PREVENTING OR REDUCING PLANT GROWTH BY BIOCEMENTATION

CROSS-REFERENCE TO RELATED APPLICATIONS

Figure 1:
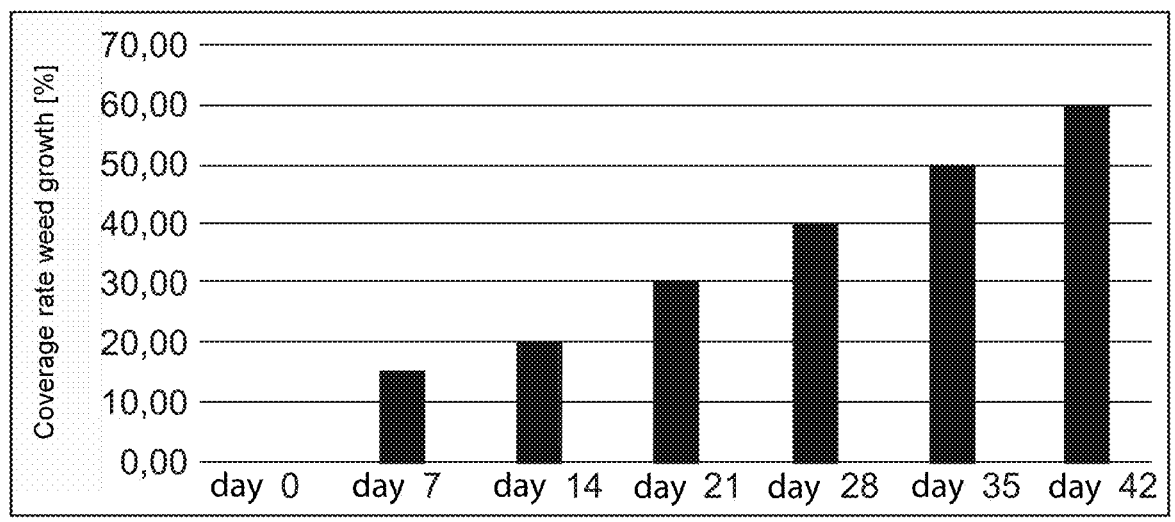
Figure 1:
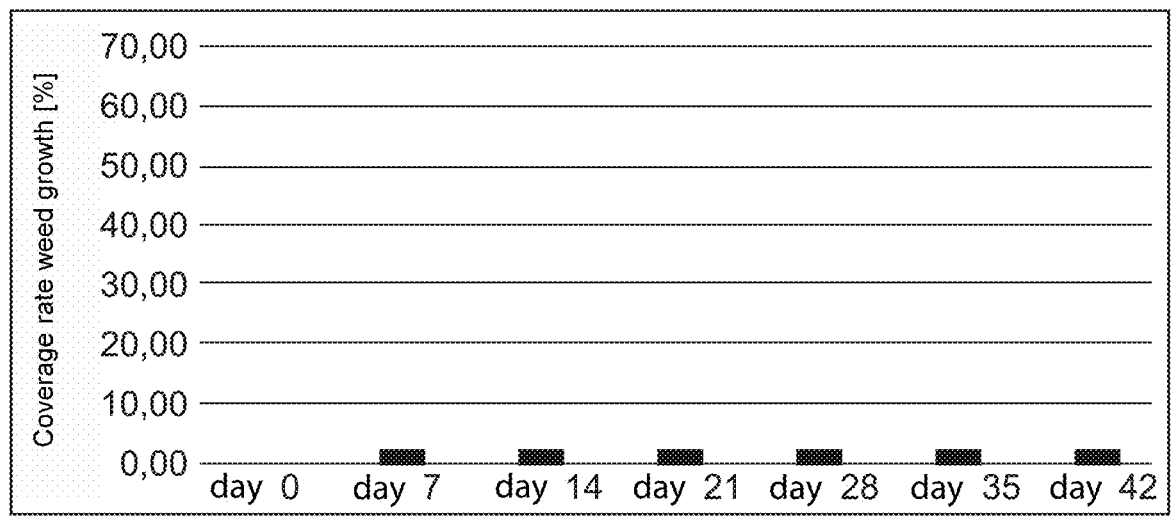
Figure 1:

This application is a continuation application (under 35 U.S.C. § 111(a)) of PCT/EP2019/053722, filed Feb. 14, 2019, which claims benefit of German Application No. 10 2018 103 314.1, filed Feb. 14, 2018, which are incorporated herein by reference in their entireties.

The present invention primarily relates to the use of a mixture capable of biocementation as a means of preventing or reducing plant growth, preferably weed growth, on/in a substrate. The invention also relates to a method for preventing or reducing plant growth, preferably weed growth, on/in a substrate.

Further aspects and preferred forms of the present invention result from the following explanations, the attached examples and in particular the attached patent claims.

The uncontrolled growth of weeds is a constant problem in agriculture, in cities and municipalities and in the area of home gardens, as it leads to yield losses in agriculture and is perceived as very disturbing and unattractive on paths and other surfaces. For this reason, weeds are combated and/or destroyed by thermal methods such as flaming, manual weeding by hand or with the aid of various tools or chemical agents. However, it can currently be observed that more and more resistancies are being developed against many of the existing products and they must therefore be used repeatedly, which further increases the cost of their use. In addition, the treated areas are quickly repopulated by uncontrolled seed inflow.

It was therefore the primary object of the present invention to provide a means for preventing or reducing unwanted plant growth that would overcome the above problems.

According to the invention, this primary object is solved by using a mixture capable of biocementation as a means for preventing or reducing (through the processes of biocementation, respectively) plant growth, preferably weed growth.

In the context of the present text, the term biocementation stands for an essentially natural solidification and/or hardening of (permeable) substrates (as defined below in the context of the method according to the invention). This prevents or reduces plant growth on/in these substrates. Biocement within the scope of this text is the product of the biocementation as defined herein.

According to a preferred embodiment, said essentially natural solidification and/or hardening is a process in which parts of the substrate on/in which plant growth is to be reduced or prevented are bound together by one or more binders contained in the mixture to be used according to the invention and/or formed from its components, thereby effecting solidification and/or hardening (biocementation) of the substrate or parts of the substrate. According to a particularly preferred embodiment, said natural solidification and/or hardening is a process in which (living) organisms, parts thereof or enzymes, which are preferably obtained from and/or produced by said organisms or parts thereof, are used to form carbonate, induce carbonate formation and/or catalyse carbonate formation. The formed carbonates connect the parts of the substrate or the substrate on/in which the plant growth is to be reduced or prevented, whereby a solidification and/or hardening of the substrate or parts thereof takes place. The carbonates formed within the scope of this text therefore preferably represent a minimum component of the biocement. Optionally or alternatively, the addition of certain additives (as defined below) can (additionally) solidify and/or harden the substrate or parts of the substrate on/in which plant growth is to be reduced or prevented. According to a further embodiment, the biocement may therefore also consist of or comprise the additives or substances derived thereof to be used according to the invention (as defined below).

Therefore, according to a preferred embodiment, removal of the substrate on/in which plant growth, preferably weed growth, is to be reduced or prevented is not necessary to prevent or reduce plant growth and is therefore preferably not part of a use according to the invention, especially since it is precisely solidification and/or hardening of the substrate (through the processes of biocementation, respectively) that prevents or reduces plant growth, preferably weed growth.

According to another preferred embodiment, removal of the substrate on/in which plant growth, preferably weed growth, is to be reduced or prevented, from its original location is followed by mixing said substrate with the mixture capable of biocementation (as described herein) at a different location (e.g. in a mixer) and (re)application of the resulting mixture at the original location (or alternatively at a different location), where biocementation is to be carried out.

Furthermore, in the context of the use according to the invention as described herein, advantageously no compacting of the substrate on/in which the plant growth is to be reduced or prevented, or of the mixture of substrate and mixture capable of biocementation (as described herein), or of the biocement layer formed, is necessary, in order to achieve a prevention or reduction of plant growth, preferably the growth of weeds, and thus preferably also not a component of a use according to the invention.

In the context of the present text, the term plant stands for land plants, i.e. the monophyletic group of embryophyta characterized by a common, functionally understood feature complex of several synapomorphies. Their main groups are: the liverworts (Marchantiopsida), hornworts (Anthocerotopsida) and mosses (Bryopsida), which are often grouped in the paraphyletic moss group, lycopods (lycopsida), horsetails (equisetopsida) and ferns in the narrow sense (Filicopsida), as well as the monophyletic seed plants (Spermatophyta) with the angiosperms and the different development lines of the gymnosperms.

In the context of the present text, the term weed stands for all plants (including mosses and ferns) of the spontaneous or undesirable accompanying vegetation in cultivated plants, grassland or (home) gardens which develop from the seed potential of the soil (as first shoots or re-sprouts), via root runners, plant parts or seed inflows, and which are preferably not specifically cultivated there. Synonyms for weed are wild herb and wild plant. In the context of the present text, the term cultivated plants stands for plants whose growth is desired.

The process of microbial biocementation, for example, is described in the patent application WO 2006/066326 A1. The patent application discloses a process for forming high-strength biocement in a permeable starting material, wherein the starting material is admixed with an effective amount of (i) a urease-producing microorganism, (ii) urea, and (iii) calcium ions. The urease-catalyzed conversion of urea into carbonate and its reaction with the calcium ions provided produces calcium carbonate, which solidifies the starting material. It is described inter alia that the process disclosed therein is suitable for applications in mining, civil engineering or the provision of special materials.

WO 2016/010434 A1 describes a process for producing a self-healing cementitious material comprising mixing a cementitious starting material, a healing substance and a fibrous reinforcing material, wherein the healing substance comprises bacterial material and the fibrous reinforcing material comprises a biodegradable polymer. The bacteria used there are able to provide carbonates or phosphates and can be denitrifying bacteria according to one embodiment.

The solution approach of the present invention is based on the use of biocementation for mechanical suppression, i.e. prevention or reduction, of plant growth, preferably weed growth, by biological solidification of the substrate on/in which the plant grows. The mixture to be used according to the invention is therefore referred to below as a weed suppressing agent. Depending on the individual components of the mixture to be used according to the invention (see below), in addition to mechanical suppression, i.e. prevention or reduction, of plant growth, other processes (as described below) can also play a role in suppressing the plant growth.

According to an embodiment, a use of the mixture as described herein according to the invention may take place in a locally restricted area, so that in the area not treated with the mixture (as described herein), where no solidification and/or hardening of the substrate on/in which the plants grow takes place, cultivated plants may (continue to) be cultivated.

According to another embodiment, it is conceivable to treat the substrate to be treated on/in which the plants grow with a certain amount or type of mixture (as described herein) so that the resulting solidification and/or hardening of said substrate allows the growth of cultivated plants, but prevents or reduces the growth of weeds. In this case—but also generally in connection with the present invention—the mixture to be used according to the invention may also contain fertilisers which stimulate the growth of the said cultivated plants.

A preferred embodiment therefore refers to a use of a mixture according to the invention as described herein, where the resulting solidification and/or hardening of the substrate on/in which the plant grows allows the growth of one or more cultivated plants, but prevents or reduces the growth of weeds.

In an exemplary experiment, a field with arable soil was ploughed and fertilized, young plants of kohlrabi were inserted into the arable soil and the arable soil was watered intensively. On the following day, a mixture capable of biocementation (as described herein, see e.g. example section below) was applied to the arable soil either as a solid mixture by hand or as a liquid mixture with the aid of a crop protection sprayer. In contrast to a control in which only water was applied instead of a mixture capable of biocementation (as described herein), good weed suppression was achieved with only isolated germination of weeds while the cultivated plant (kohlrabi) continued to grow.

Advantageously, a use the mixture according to the invention for the purposes as described herein leads to a thickness of the biocement layer that is particularly suitable. Preferably a biocement layer with a thickness of at least 1 mm is obtained, preferably of at least 3 mm, more preferably of at least 10 mm. It is further preferred if the layer thickness is maximally 100 mm, preferably maximally 50 mm, further preferred maximally 35 mm, further preferred maximally 30 mm. As a result, it is particularly preferred if the layer thickness of the total biocement layer formed is in the range from 1 mm to 100 mm, preferably from 10 mm to 50 mm, more preferably from 10 mm to 35 mm, more preferably from 10 to 30 mm. The layer thickness of the biocement layer comprises the area of the substrate which is solidified by the addition of the mixture. The thickness of the biocement layer can be determined by manual measurement after mechanical breaking of the layer using a caliper gauge. Alternatively, different (non-destructive) measuring methods from construction, agriculture, geology or other fields of application can be used (e.g. hand-held device MIT-SCAN-T2).

According to a preferred embodiment, a use according to the invention of the mixture as described herein leads to a biocement layer that is permeable to water, i.e. water-permeable or water-semipermeable. This is particularly advantageous because, for example, rainwater can penetrate into the biocement layer without hindrance and flow off even in the biocemented area. The water permeability of a sample is conventionally stated as the water flow through the sample in a defined period of time. It can be expressed as permeability rate (in cm/h, mm/h or cm/day) or alternatively as coefficient of permeability (in m/s). An indication of the coefficient of permeability allows a classification of a sample, preferably a soil sample, for example into the categories (water)permeable, (water)semipermeable and (water)impermeable.

In the context of the present text, the term "waterpermeable biocement layer" means a biocement layer with a (water) coefficient of permeability greater than $10^{-5}$ to $10^{0}$ m/s, and the term "watersemipermeable biocement layer" for a biocement layer having a (water) coefficient of permeability of greater than $10^{-9}$ to $10^{-5}$ m/s, and the term "waterimpermeable biocement layer" for a biocement layer having a (water) coefficient of permeability of $10^{-11}$ (or less) to $10^{-9}$ m/s. Common methods for determining the coefficient of permeability comprise laboratory methods (e.g. ram core probing and subsequent determination of water saturated permeability in the laboratory) and field methods (e.g. determination of the infiltration rate with a double ring infiltrometer).

A preferred embodiment relates to the use of a mixture as defined herein, wherein the biocement layer formed has a (water) coefficient of permeability of greater than $10^{-9}$ to $10^{0}$ m/s, preferably greater than $10^{-9}$ to $10^{-3}$ m/s, more preferably greater than $10^{-8}$ to $10^{-3}$ m/s.

The use according to the invention shows a robust functionality under real (environmental) conditions, is easy to apply (often by a single application) and allows the renunciation or reduction of chemical herbicide(s). Furthermore, it can be used in combination with existing products or processes for combating weeds. Advantageously, the use according to the invention is reversible, i.e. the biocementation of the substrate or parts of the substrate can be reversed if necessary, for example by the application of suitable acids or by mechanical breaking as well as by weathering and natural degradation. In this way, the substrate or parts of the substrate can be made accessible again for the cultivation of cultivated plants.

A preferred embodiment therefore relates to the use of a mixture as defined herein, wherein the biocementation of the substrate or parts of the substrate may be reversed or preferably are reversed.

Another preferred embodiment relates to the use of a mixture as defined herein, wherein the mixture comprises or consists of one or more organisms and/or enzymes. Preferably, the use according to the invention relates to a use as described above, wherein the mixture comprises or consists of the following components:

(i) one or more organisms and/or enzymes capable of forming carbonate and/or of inducing and/or catalyzing carbonate formation,
(ii) one or more substances for the formation of carbonate,
(iii) optionally: one or more cation sources; and
(iv) optionally: one or more additives.

According to a preferred embodiment, the organism or organisms in component (i) of the mixture to be used according to the invention is/are one organism/several organisms which, when assay A comprising the following steps is carried out Assay A
(i) providing and contacting an organism to be characterised or a mixture of organisms to be characterised, one or more substances for the formation of carbonate (and optionally further substances) and optionally a substrate,
(ii) providing a means for detecting a ureolysis and/or carbonate formation,
(iii) combining the mixture resulting from step (i) with the means from step (ii), and
(iv) determining from the means from step (ii) whether a ureolysis and/or carbonate formation is present, leads to the detection of a ureolysis and/or carbonate formation in step (iv), preferably—if a substrate has been provided—the detection of biocementation, preferably one that is sufficient to prevent or reduce plant growth, preferably the growth of weed (for details on controlling prevention or reduction of plant growth see below, example section).

Advantageously, in the framework of Assay A both ureolytic and non-ureolytic organisms can be tested for their ability to adequately biocementize.

The following explanations may be helpful in the selection of organisms suitable in the context of a use according to the invention.

The substance(s) for the formation of carbonate to be provided in step (i) of Assay A as defined herein and the substrate, which is solidified or hardened by the biocementation, to be optionally provided are further defined below, also with the aid of selected and preferred examples. The optional further substances may be nutrient media, nutrient sources, cation sources (as described further below in the text) and/or additives (as described further below in the text).

In step (i) of Assay A as defined herein, e.g. pure cultures of the organism to be characterized (e.g. from strain collections) can be provided and/or the organism to be characterized or the mixture of organisms to be characterized can e.g. be isolated from a suitable sample (e.g. soil sample) using a nutrient medium (e.g. Christensen urea agar, B4 medium or M-3P medium) and cultured to a cell culture suitable for further investigation. The nutrient medium used for isolation and cultivation may be liquid or solid. The skilled person knows that e.g. the nutrient medium can be varied according to the requirements of the organism(s). The organism(s) are preferably cultured to a cell density between $1\times10^7$ and $1\times10^{12}$ cells/ml. The skilled person knows that, for example, the cultivation temperature and the medium composition are selected according to the needs of the organism or the mixture of organisms. The provided or prepared cell culture is then contacted with the substance(s) for the formation of carbonate (and optionally other substances) and optionally a substrate to obtain a mixture which is then combined in step (iii) with the means from step (ii).

The means for detecting a ureolysis and/or carbonate formation in step (ii) of Assay A as defined herein is for example a pH indicator, a device and/or one or more substance(s) for measuring urease activity, a device and/or one or more substance(s) for measuring the amount of carbonate formed by the biocementation, or a device for measuring the degree of solidification of the substrate (by the biocementation).

The determination of whether a ureolysis and/or carbonate formation is present in step (iv) of Assay A as defined herein, in particular the detection of a biocementation, preferably a biocementation sufficient to prevent or reduce plant growth, preferably weed growth, may take place qualitatively or preferably quantitatively.

A preferred method for said determination is, for example, the addition of a suitable pH indicator (e.g. phenol red, preferably at a concentration of 15 mg/L) to the mixture resulting in step (i). In the presence of a ureolysis and/or carbonate formation, the pH of the mixture increases, leading to a change in the colour of the indicator (e.g. pink colouring in the case of phenol red).

If a cation source, preferably a calcium source, is added to the mixture of step (i) (in addition to the one or more substance(s) for the formation of carbonate), lime crust formation usually occurs around the colonies or on the colonies of the organism(s) in case of the presence of ureolysis and/or carbonate formation in solid media. In the case of liquid culture media, lime precipitation usually occurs if a cation source, preferably a calcium source (e.g. $CaCl_2$), and a carbonate source (e.g. urea) are sufficiently available. This lime crust formation or lime precipitation can also serve as optical evidence for ureolysis and/or carbonate formation, or the said lime crust formation or lime precipitation can be analyzed by qualitative and/or quantitative carbonate determination, preferably with the aid of (semi-) quantitative carbonate determination according to Scheibler or a further development of this method (e.g. as in Horvath, B. et al., A Simple Method for Measuring the Carbonate Content of Soils, *Soil Science Society of America Journal* 2005, 69, 1066-1068).

Another preferred method for said determination is, for example, a measurement of the urease activity of the organism or the mixture of organisms. The organism to be analyzed or mixture of organisms to be analyzed is thereby mixed, amongst others, with buffered urea (e.g. 1.5 M urea in 0.1 M Tris-HCl, pH 7.5) and the formation of the resulting ammonium ions is measured conductometrically as the increase of the measurement signal over time and the urease activity is calculated (as e.g. described in V. S. Whiffin, *Microbial $CaCO_3$ Precipitation for the production of Biocement*, Dissertation, 2004, Murdoch University, Western Australia). The urease activity preferably lies between $1\times10^{-7}$ to $1\times10^{-11}$ mM hydrolyzed urea/min/cm/cells/ml, further preferred between $1\times10^{-8}$ to $1\times10^{-10}$ mM hydrolyzed urea/min/cm/cells/ml, further preferred between $1\times10^{-8}$ to $1\times10^{-9}$ mM hydrolyzed urea/min/cm/cells/ml. The former corresponds approximately to a urea hydrolysis rate of 0-300 mM hydrolysed urea/min, depending on the number of cells used. Another preferred method for said determination is, for example, the measurement of the carbonate quantity formed by the biocementation, preferably with the aid of the (semi-) quantitative determination of carbonate according to Scheibler. The mixture to be investigated is preferably incubated for 48 h openly at room temperature (25° C.). A precipitated pellet can then be obtained by centrifugation and drying for further use. The dried pellet can be used for (semi-)quantitative detection of the calcium carbonate formed, preferably by the carbonate determination according to Scheibler. Optionally, the dried precipitate can be weighed beforehand and the precipitation efficiency be calculated. Optionally, an additional qualitative determination of ureolysis and/or carbonate formation can be performed in parallel. Phenol red (15 mg/L) can be added to the mixture from step (i). The supernatant to be discarded when extracting the pellet is then usually pink coloured when ureolysis and/or carbonate formation is present.

Another preferred method for said determination is, for example, the measurement of the degree of solidification of the substrate (by the carbonate produced during biocementation). A suitable substrate for this is e.g. quartz sand, preferably with a grain size of 0 to 2 mm (as model substrate). The remaining components of the mixture from step (i) are preferably applied to or introduced into the substrate in an amount of the resulting mixture of 5 $l/m^2$ (in the case of a liquid mixture). Subsequent incubation should be performed openly and at room temperature or above room temperature for at least 2 days (preferably for at least 10 days). The strength of the biocement layer formed is then determined by fracture mechanical analysis using a digital (breaking) force gauge in accordance with DIN EN 196-1: 2005-05. In comparison to the control (application of a comparative mixture without organism or organisms onto the substrate), differences in the breaking force of $\geq 3$ N (or $\geq 0.01$ MPa), preferably of $\geq 30$ N (or $\geq 0.1$ MPa), should be detectable.

Within the scope of Assay A, the thickness of the biocement layer can also be determined with the aid of a caliper gauge; in the case of successful solidification, it should preferably amount to an average of $\geq 3$ mm in the investigated area.

According to a preferred embodiment, the organism or the organisms in component (i) of the mixture to be used according to the invention is/are one organism/several organisms, which in step (iv) of Assay A as defined herein in relation to two or more of the determination methods described above, preferably three or more, most preferably four or more, most preferably all determination methods, lead(s) to the detection of a ureolysis and/or carbonate formation, preferably a biocementation, preferably one sufficient to prevent or reduce plant growth, preferably weed growth (for details on controlling the prevention or reduction of plant growth see below, example section).

Preferred is a use as described above, wherein the mixture is present in liquid form, as a gel, paste or powder.

The mixture to be used according to the invention may be present or used in the form of a liquid, gel-like, paste-like or powdery mixture or in the form of two, three, four or more liquid and/or gel-like and/or paste-like and/or powdery pre-mixtures which are present separately from each other and which are mixed together before or during use.

Particularly in the form of a powder, the mixture or pre-mixtures advantageously have a particularly long storage stability, preferably of at least 12 to 24 months.

A powder form of the mixture or pre-mixture can be obtained by standard processes known to the skilled person, e.g. spray drying, freeze drying, (low-temperature) vacuum drying, fluid bed drying and/or with the aid of filtration with filtering aids.

In the context of this text, powdery means that the content of liquid components, preferably of water, in the mixture is 10 wt. % or less, preferably 5 wt. % or less, preferably 2.5 wt. % or less, more preferably 1.0 wt. % or less, most preferably 0.1 wt. % or less, based on the total weight of the mixture or pre-mixture to be used according to the invention.

The content of liquid components, preferably of water, in the mixture or pre-mixture can be determined by standard methods known to the skilled person. For example, a gravimetric determination of the content of the liquid components can be performed by weighing the sample taken, heating it to a temperature above the boiling point of the liquid components for a sufficient period of time for drying and then weighing it again. From the difference in weight before and after drying, the content in % by weight of liquid components, preferably of water, can be determined.

According to a further embodiment, the mixture to be used according to the invention may also be present or used in the form of a gel-like or paste-like mixture or in the form of two, three, four or more separate solid and/or liquid and/or gel-like and/or paste-like pre-mixtures which are mixed together before or during use.

Preferred is a use as described above, wherein one or the, several or all organism(s) is/are selected from the group consisting of microorganisms, preferably is/are selected from the group consisting of microorganisms of the phylum Firmicutes, preferably of the class Bacilli, preferably of the order Bacillales, preferably of the families Planococcaceae or Bacillaceae, preferably of the genera *Sporosarcina, Lysinibacillus* or *Bacillus*, preferably selected from the species *Sporosarcina pasteurii, Sporosarcina ureae, Lysinibacillus sphaericus, Lysinibacillus fusiformis, Bacillus megaterium, Lysinibacillus* sp., *Bacillus pseudofirmus, Bacillus halodurans* or *Bacillus cohnii*; and microorganisms of the phylum Proteobacteria, preferably of the classes Alphaproteobacteria, Gammaproteobacteria, Deltaproteobacteria or Epsilonproteobacteria, preferably of the orders Enterobacteriales, Myxococcales, Campylobacterales, Pseudomonadales or Caulobacterales, preferably of the families Enterobacteriaceae, Myxococcaceae, Helicobacteraceae, Pseudomonadaceae or Caulobacteraceae, preferably of the genera *Proteus, Myxococcus, Helicobacter, Pseudomonas* or *Brevundimonas*, preferably selected from the species *Proteus vulgaris, Proteus mirabilis, Myxococcus xanthus, Helicobacter pylori, Pseudomonas aeruginosa* or *Brevundimonas diminuta*; and microorganisms of the phylum Actinobacteria, preferably of the class Actinobacteria, preferably of the order Actinomycetales, preferably of the families Brevibacteriaceae or Micrococcineae, preferably of the genera *Brevibacterium* or Micrococcaceae, preferably selected from the species *Brevibacterium* linens or *Arthrobacter crystallopoietes*; and microorganisms of the phylum Cyanobacteria, preferably of the class Cyanobacteria, preferably of the order Synechococcales, preferably of the family Synechococcaceae, preferably of the genus *Synechococcus*, preferably of the species *Synechococcus*; and aerobic bacteria, anaerobic bacteria, facultative anaerobic bacteria and their intermediates.

This includes all variants, serotypes, mutants and spores and any derived genetically modified microorganisms.

The aforementioned organism(s), preferably microorganisms, may be present (together or separately) in liquid(s) such as buffer solutions, solvents, culture media and/or mixtures thereof, which may also be deep-frozen or be present in powder form.

According to the present invention, the organism or organisms capable of forming carbonate and/or of inducing and/or catalyzing carbonate formation is or are part of the mixture used.

Alternatively, it is conceivable and also disclosed in the context of this text that (indigenous) organisms that are present in the substrate, preferably soil in/on which the plant growth takes place, or are isolated from said substrate, cultivated in the laboratory and then reintroduced onto/into the substrate, are capable of forming carbonate and/or of inducing and/or catalyzing carbonate formation. In this case, alternative or equivalent embodiments are conceivable (and accordingly included herein as according to the invention) in which the organisms of the mixture to be used according to the invention and the (indigenous) organisms in/on the substrate together form the carbonate, induce and/or catalyse carbonate formation, or in which the mixture to be used does not itself contain any organisms capable of forming carbonate, inducing and/or catalyzing carbonate formation. According to a preferred embodiment, component (i) of the mixture to be used according to the invention comprises or consists of a combination of one organism or several organisms capable of forming carbonate, inducing and/or catalyzing carbonate formation, and those unable to do so.

According to a preferred embodiment, component (i) of the mixture to be used according to the invention comprises or consists of a combination of aerobic bacteria, anaerobic bacteria and/or facultative anaerobic bacteria and/or their intermediates.

According to another preferred embodiment, component (i) the mixture to be used according to the invention comprises or consists of a combination of one organism or several organisms capable of ureolytically forming carbonate, ureolytically inducing and/or catalyzing carbonate formation, and those not capable of ureolysis or not at all capable of forming carbonate and/or inducing and/or catalyzing carbonate formation.

The skilled person thereby knows that biocementation (as defined herein) is particularly efficient in a certain cell number spectrum of the organisms used when a mixture (as defined herein) is used according to the invention. According to our own investigations, the cell count of the organism or organisms in the mixture to be used according to the invention is preferably at least $10^7$ cells/mL, more preferably at least $10^8$ cells/mL, and/or preferably at most $10^{12}$ cells/mL, more preferably at most $10^{10}$ cells/mL, most preferably at most $10^9$ cells/mL. According to a preferred embodiment, the number of cells of the organism or organisms in the mixture to be used according to the invention is $10^8$ to $10^9$ cells/mL.

A use as described above is preferred, wherein one or the, several or all of the enzymes is/are selected from the group consisting of urease, asparaginase, carbonic anhydrase and metabolic enzymes.

Metabolic enzymes in the context of the present text are preferably enzymes of the metabolism of one or more (micro-)organisms as described herein, which, for example by conversion of acetate and/or lactate, are capable of forming carbonate and/or of inducing and/or catalyzing carbonate formation. Preferably, one or more organisms (as defined above) capable of producing one or more of the above enzymes is/are used in component (i) of the mixture to be used according to the invention, or preferably the above enzymes are obtained or released from the above organisms.

If the organism or organisms used is or are pathogenic organisms, it is preferable within the scope of the present text if in component (i) of the mixture to be used according to the invention only the non-pathogenic enzymes derived therefrom or released therefrom are used.

According to another preferred embodiment, combinations of enzymes obtained or released from the above organisms with enzymes of non-microbial origin (e.g. vegetable enzymes) may be used in component (i) of the mixture to be used according to the invention. For example, the enzyme urease can be obtained from soybeans and used according to the invention.

According to another preferred embodiment, combinations of one or more of the above-mentioned organisms capable of forming carbonate and/or of inducing and/or catalyzing carbonate formation with one or more of the above-mentioned enzymes capable of forming carbonate and/or of inducing and/or catalyzing carbonate formation may be used in component (i) of the mixture to be used according to the invention.

Carbonates can be generated by various metabolic processes with the help of the above-mentioned enzymes. For example, aerobic metabolism of organic carbon sources may lead to ammonification (e.g. enzyme asparaginase) or heterotrophic metabolism of organic carbon sources (e.g. calcium lactate or calcium acetate) may take place. Both processes provide carbonates. Aerobic and anaerobic photosynthesis can also be used to form carbonates, as can anaerobic denitrification, anaerobic sulfate reduction and (an)aerobic methane oxidation.

The biocementation with the aid of the mixture to be used according to the invention may therefore be based on one or more of the above metabolic processes.

Therefore, a use as described above is preferred, wherein one or the, several or all substances for the formation of carbonate is/are selected from the group consisting of urea and salts thereof, organic acids such as lactic acid and salts thereof, preferably carboxylates, and esters thereof, gluconic acid and salts thereof, preferably carboxylates, and esters thereof, acetic acid and salts thereof, preferably carboxylates, and esters thereof, formic acid and salts thereof, preferably carboxylates, and esters thereof, peptides, preferably containing asparagine, glutamine and/or glutamic acid, amino acids, preferably asparagine, glutamine and glutamic acid, and salts thereof, preferably carboxylates, and esters thereof, vegetable and animal complex substrates, in particular peptone, yeast extract, meat extract, nutrient broth and casamino acid, industrial waste streams, in particular maize steep liquor, lactose mother liquor, protein lysates, preferably from peas, meat or tomatoes, anaerobic substrates, preferably carbon dioxide and methane.

Furthermore preferred is a use as described above, wherein one or the, several or all cation sources is/are selected from the group consisting of organic and inorganic calcium salts, preferably calcium nitrate, calcium acetate, calcium lactate and calcium chloride, magnesium salts, manganese salts, zinc salts, cobalt salts, nickel salts, copper salts, lead salts, iron salts, cadmium salts, polymers, preferably cationic polymers, heavy metal cations, light metal cations, radioactive cations and mixtures thereof.

According to the present invention, the cation source(s) may or may not be contained in the mixture to be used according to the invention. If they are not contained in the mixture, they may be present on/in or added to the substrate on/in which the plant grows to enable biocementation.

Preferred is also a use as described above, wherein one or the, several or all of the additives is/are selected from the group consisting of the following substances/substance mixtures (preferably as long as it/they is/are not already contained in component (ii)) nutrients; (bio-)polymers, preferably polyhydroxybutyrate (PHB), polylactide (PLA), polybutylene succinate (PBS), polyacrylic acid (PM), polymethacrylate (PMA), poly(2-hydroxyethylmethacrylate) (PHEMA), polyvinyl alcohol (PVOH), polyvinyl acetate (PVAC), polyvinyl pyrrolidone (PVP), poly(2-ethyl-2-oxazoline), polystyrene (PS), polyamide, copolymers, polyamino acids, cellulose and derivatives thereof, starch and derivatives thereof, lignins and derivatives thereof, pectins and derivatives thereof, natural adhesives, in particular gum arabic, latex, rubber and derivatives thereof, chitin and derivatives thereof, chitosan and derivatives thereof, cyclodextrins and derivatives thereof, dextrins and derivatives thereof; hydrogel formers, preferably xanthan gum, alginates and agar agars; cold soluble and/or warm soluble (plant) glues; calcium carbonates and mixtures containing calcium carbonates, preferably mother-of-pearl, amorphous calcium carbonates, precipitated calcium carbonate, aragonite, calcite, vaterite and mixtures and derivatives thereof; polysaccharides and extracellular polymeric substances (EPS), preferably microbial exopolysaccharides, preferably containing or consisting of maleic acid, acetic acid, lactic acid, lactose, sucrose, glucose, fructose and/or inulin; protein sources, fibres and fibrous materials, preferably casein, albumin, yeast extracts, peptones, cellulose fibres, wood fibres, wood cellulose fibres; residues and industrial materials, preferably maize steep liquor, lactose mother liquor, protein lysates, molasses, protein waste, preferably from yeast production, meat production, dairy industry and paper production; silicates and derivatives thereof; acrylates and derivatives thereof; water glasses and water glass-like binders; cements and cement additives, preferably sand, lime and derivatives thereof, aluminium oxide, calcium oxide, calcium hydroxide, aluminium hydroxide, ash, preferably fly ash and bone ash, microsilica, kaolins, bentonites, filling materials, preferably white lime (hydrate), limestone crushed sand and limestone powder; resins and epoxides; natural and chemical herbicides; fungicides; molluscicides; insecticides; hydrophobizers and wax emulsions; emulsifiers; binders; thixotropic agents; crystallization nuclei and crystallization modifiers; fatty acids; minerals and trace elements; salts, preferably phosphates and sulphates; rocks, preferably pumice stone and slate powder; bacteria capable of forming polymers; and substance(s) modifying the biocementation.

In the context of the present invention, the additive(s) preferably are either substances which influence the process of biocementation itself (e.g. nutrients) or substances which influence the resulting product of the biocementation, i.e. the properties of the biocement (e.g. its water resistance) or substances which influence the plant whose growth is suppressed (e.g. herbicides).

Examples of substances that can influence the properties of the biocement are preferably additives to be used according to the invention, which are capable of (additionally) solidifying and/or hardening the substrate or parts of the substrate on/in which the plant growth is to be reduced or prevented. These may, for example, be sugar molecules (as defined above) or polymers formed by bacteria. As described above, said additives to be used according to the invention are in this case a—if applicable sole—component of the biocement (alternatively to or in addition to the preferably formed carbonate(s)).

According to the present invention, the additive(s) may be present in the mixture to be used according to the invention (i.e. be part of the mixture to be used) or be contained on/in the substrate on/in which the plant growth takes place. Alternatively, they may also not be present.

In the context of the present text, the monomers of the additives mentioned above, in particular of the mentioned (bio-)polymers, are also considered to be additives to be used according to the invention.

The skilled person is aware that the application quantity and mode of action of the additive(s) depends strongly on its/their own properties or on the properties of the other components of the mixture to be used according to the invention or on the properties of the substrate and will accordingly select suitable combinations and application quantities of the additive(s).

Preferred is also a use as described above, wherein the plant or weed is selected from the group consisting of dicotyls of the genera: *Abutilon, Aegopodium, Aethusa, Amaranthus, Ambrosia, Anachusa, Anagallis, Anoda, Anthemis, Aphanes, Arabidopsis, Atriplex, Barbarea, Bellis, Bidens, Bunias, Capsella, Carduus, Cassia, Centaurea, Chenopodium, Chrysanthemum, Cirsium, Conium, Conyza, Consolida, Convolvulus, Datura, Descurainia, Desmodium, Emex, Equisetum, Erigeron, Erodium, Erysimum, Euphorbia, Fumaria, Galeopsis, Galinsoga, Galium, Geranium, Heracleum, Hibiscus, Ipomoea, Kochia, Lamium, Lapsana, Lathyrus, Lepidium, Lithoserpermum, Linaria, Lindernia, Lycopsis, Malva, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Sisymbrium, Solanum, Sonchus, Sphenoclea, Stachys, Stellaria, Taraxacum, Thlaspi, Trifolium, Tussaligo, Urtica, Veronica, Viola, Xanthium*; dicotyls of the genera: *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia*; monocotyls of the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Juncus, Leptochloa, Lolium, Monochoria, Panicum, Paspalum, Phalaris, Phleum, Poa, Rottboellia, Sagittaria, Scirpus, Setaria, Sorghum*; and monocotyls of the genera: *Allium, Ananas, Asparagus, Avena, Hordeum, Oryza, Panicum, Saccharum, Secale, Sorghum, Triticale, Triticum, Zea*; mosses of the lineages liverworts (Marchantiosida), hornworts (Anthocerotopsida), mosses (Bryopsida);

preferably wherein the growth of at least two, three, four, five, six, seven, eight, nine, ten, more than ten or all of these plants is prevented or reduced.

According to a preferred embodiment of the use according to the invention, the, one, several or all of the plants are one or more liverwort(s) selected from the group consisting of the genera: *Acolea, Acrobolbus, Acrochila, Acromastigum, Acroscyphella, Acroscyphus, Acrostolia, Adelocolia, Aitchisoniella, Alicularia, Ansonia, Allisoniella, Alobiella, Alobiellopsis, Amazoopsis, Amphicephalozia, Amphilophocolea, Andrewsianthus, Aneura, Anomacaulis, Anomoclada, Anomylia, Anthelia, Anthelis, Aphanolejeunea, Aplozia, Apomarsupella, Apometzgeria, Apotreubia, Arachniopsis, Arctoscyphus, Amelia, Ascidiota, Asterella, Athalamia, Austrofossombronia, Austrolembidium, Austrolophozia, Austrometzgeria, Austroscyphus, Balantiopsis, Bazzania, Blasia, Blepharidophyllum, Blepharostoma, Brevianthus, Calycularia, Calypogeia, Calyptrocolea, Campanocolea, Castanoclobos, Cavicularia, Cephalojonesia, Cephalolobus, Cephalomitrion, Cephalozia, Cephaloziella, Cephaloziopsis, Ceratolejeunea, Cesius, Chaetophyllopsis, Chiastocaulon, Chiloscyphus, Chloranthelia, Chonecolea, Cladomastigum, Cladopodiella, Clandarium, Clasmatocolea, Cololejeunea, Colura, Conocephalum, Conoscyphus, Corsinia, Cronisia, Crossogyna, Cryptochila, Ctyptocolea, Cryptocoleopsis, Cryptomitrium, Cryptostipula, Cryptothallus, Cuspidatula, Cyanolophocolea, Cyathodium, Cylindrocolea, Delavayella, Dendrobazzania, Dendromastigophora, Denotarisia, Dichiton, Dinckleria, Diplocolea, Diplophyllum, Douinia, Drepanolejeunea, Drucella, Dumortiera,*

Dumortieropsis, Enigmella, Eocalypogeia, Eoisotachis, Eopleurozia, Eotrichocolea, Eremonotus, Eucalyx, Evansia, Evansianthus, Exormotheca, Fossombronia, Frullania, Fuscocephaloziopsis, Gackstroemia, Geocalyx, Geothallus, Gerhildiella, Goebeliella, Goebelobryum, Gongylanthus, Gottschea, Gottschelia, Greeneothallus, Grollea, Gymnanthe, Gymnocoleopsis, Gymnomitrion, Gymnoscyphus, Gyrothyra, Haesselia, Haplomitrium, Harpalejeunea, Harpanthus, Hattoria, Hattorianthus, Hattoriella, Hepatostolonophora, Herbertus, Herpetium, Herpocladium, Herzogianthus, Herzogobryum, Heterogemma, Heteroscyphus, Horikawaella, Hyalolepidozia, Hygrobiellalwatsukia, Hygrolembidium, Hygrophila, Hymenophyton, Hypoisotachis, Isolembidium, Isotachis, Jamesoniella, Jensenia, Jubula, Jubulopsis, Jungermannia, Jungermannites, Krunodiplophyllum, Kurzia, Kymatocalyx, Lamellocolea, Leiocolea, Leiomitra, Leiomylia, Leioscyphus, Lejeunea, Lembidium, Lepidogyna, Lepidolaena, Lepidozia, Leptolejeunea, Leptophyllopsis, Leptoscyphopsis, Leptoscyphus, Lethocolea, Liochlaena, Lobatiriccardia, Lophocolea, Lophonardia, Lophozia, Lophoziopsis, Lunularia, Macrodiplophyllum, Maculia, Makinoa, Mannia, Marchantia, Marchesinia, Marsupella, Marsupidium, Massula, Massularia, Mastigobryum, Mastigopelma, Mastigophora, Mastigopsis, Mesoptychia, Metacalypogeia, Metahygrobiella, Metzgeria, Metzgeriopsis, Micrisophylla, Microlejeunea, Microlepidozia, Micropterygium, Mizutania, Mnioloma, Moerckia, Monocarpus, Monoclea, Monodactylopsis, Monosolenium, Mytilopsis, Nanomarsupella, Nardia, Neesioscyphus, Neogrollea, Neohodgsonia, Neotrichocolea, Noteroclada, Nothogymnomitrion, Nothostrepta, Notoscyphus, Noweffia, Obtusifolium, Odontolejeunea, Odontoschisma, Oleolophozia, Oxymitra, Pachyglossa, Pachyschistochila, Pallavicinia, Paracromastigum, Paraschistochila, Patarola, Pedinophyllopsis, Pedinophyllum, Peffia, Peltolepsis, Perdusenia, Perssoniella, Petalophyllum, Phycolepidozia, Phyllothaffia, Physiotium, Physotheca, Pisanoa, Plagiochasma, Plagiochila, Plagiochilidium, Plagiochilion, Platycaulis, Plectocolea, Pleuranthe, Pleuroclada, Pleurocladopsis, Pleurocladula, Pleurozia, Podanthe, Podomitrium, Porella, Prasanthus, Preissia, Prionolobus, Protolophozia, Protomarsupella, Protosyzgiella, Protosyzygiella, Pseudocephalozia, Pseudocephaloziella, Pseudolophocolea, Pseudolophozia, Pseudomarsupidium, Pseudoneura, Pseudotritomaria, Psiloclada, Pteropsiella, Ptilidium, Radula, Reboulia, Rhizocaulia, Rhodoplagiochila, Riccardia, Riccia, Ricciella, Ricciocarpos, Riella, Roivainenia, Ruizanthus, Ruttnerella, Saccobasis, Saccogyna, Sandeothallus, Sarcocyphos, Sarcomitrium, Sauteria, Scapania, Scaphophyllum, Schiffneria, Schisma, Schistochila, Schistochilaster, Schistochilopsis, Schofieldia, Sendtnera, Seppeltia, Sewardiella, Simodon, Solenostoma, Southbya, Sphaerocarpos, Sphagnoecetis, Sprucella, Steereella, Steereocolea, Stenorrhipis, Stephandium, Stephaniella, Stephanieffidium, Stephensoniella, Symphyogyna, Symphyogynopsis, Symphyomitra, Synhymenium, Syzygiella, Taeniolejeunea, Targionia, Tegulifolium, Telaranea, Thallocarpus, Treubia, Triandrophyllum, Trichocolea, Trichocoleopsis, Trichostylium, Trichotemnoma, Trilophozia, Tritomaria, Tylimanthus, Vanaea, Vandiemenia, Verdoornia, Vetaforma, Wettsteinia, Wiesnerella, Xenochila, Xenothallus, Zoopsidella, Zoopsis.

According to another preferred embodiment of the use according to the invention, the, one, several or all of the plants are one or more moss(es) selected from the group consisting of the genera: Abietinella, Acanthocladiella, Acanthocladium, Acanthodium, Acanthorrhynchium, Acaulon, Acaulonopsis, Achrophyllum, Acidodontium, Acrocladium, Acroporium, Acroschisma, Actinodontium, Actinothuidium, Adelothecium, Aequatoriella, Aerobryidium, Aerobryopsis, Aerobryum, Aerolindigia, Algaria, Aligrimmia, Alleniella, Allioniellopsis, Aloina, Aloinella, Alophosia, Alsia, Amblyodon, Amblyodum, Amblystegiella, Amblystegium, Amblytropis, Ambuchanania, Amphidium, Amphoridium, Amphoritheca, Anacalypta, Anacamptodon, Anacolia, Ancistrodes, Andoa, Andreaea, Andreaeobryum, Anictangium, Anisothecium, Anodon, Anodontium, Anoectangium, Anomobryum, Anomodon, Antitrichia, Aongstroemia, Aongstroemiopsis, Apalodium, Aphanorrhegma, Apiocarpa, Aplodon, Apterygium, Aptychella, Aptychopsis, Aptychus, Arbuscula, Arbusculohypopterygium, Archephemeropsis, Archidium, Arctoa, Argyrobryum, Arthrocormus, Aschisma, Aschistodon, Asteriscium, Astomiopsis, Astomum, Astrodontium, Astrophyllum, Atractylocarpus, Atrichopsis, Atrichum, Aulacomitrium, Aulacomnium, Aulacopilum, Austinella, Austrohondaella, Austrophilibertiella, Baldwiniella, Barbella, Barbellopsis, Barbula, Bartramia, Bartramiopsis, Beeveria, Bellibarbula, Benitotania, Bestia, Bissetia, Blindia, Boulaya, Brachelyma, Brachydontium, Brachymenium, Brachymitrion, Brachyodus, Brachysteleum, Brachytheciastrum, Brachytheciella, Brachythecium, Brachytrichum, Braithwaitea, Braunfelsia, Braunia, Breidleria, Breutelia, Brothera, Brotherella, Brotherobryum, Bruchia, Bothnia, Brymela, Bryoandersonia, Bryobeckettia, Bryobrittonia, Bryobrothera, Botoceuthospora, Bryochenea, Bryocrumia, Bryodixonia, Bryodusenia, Botoerythrophyllum, Botohaplocladium, Bryohumbertia, Bryomaltaea, Bryomanginia, Botomnium, Bryonoguchia, Bryonorrisia, Bryophixia, Bryosedgwickia, Botostreimannia, Bryotestua, Bryum, Buckiella, Bucklandiella, Burnettia, Buxbaumia, Callialaria, Cafficladium, Callicosta, Callicostella, Cafficostellopsis, Caffiergidium, Calliergon, Calohypnum, Calymperastrum, Calymperes, Calymperidium, Calymperopsis, Calyptopogon, Calyptothecium, Calyptrochaeta, Camptochaete, Camptodontium, Camptothecium, Campyliadelphus, Campylidium, Campylium, Campylodontium, Campylophyllum, Campylopodiella, Campylopodium, Campylopus, Campylostelium, Canalohypopterygium, Cardotia, Cardotiella, Caribaeohypnum, Catagoniopsis, Catagonium, Catharinea, Catharinella, Catharomnion, Catoscopium, Cecalyphum, Ceratodon, Ceuthospora, Ceuthotheca, Chaetomitrella, Chaetomitriopsis, Chaetomitrium, Chaetophora, Chamaebryum, Chamberlainia, Chameleion, Cheilothela, Chenia, Chileobryon, Chionoloma, Chionostomum, Chorisodontium, Chryso-hypnum, Chrysoblastella, Chrysocladium, Chrysohypnum, Cinclidium, Circulifolium, Cirriphyllum, Cladastomum, Cladomnion, Cladophascum, Cladopodanthus, Cladopodanthus, Claopodium, Clasmatodon, Clastobryella, Clastobryophilum, Clastobryopsis, Clastobryum, Clavitheca, Cleistocarpidium, Cleistostoma, Climacium, Cnestrum, Codonoblepharon, Codonoblepharum, Codriophorus, Coelidium, Coleochaetium, Colobodontium, Conardia, Conomitrium, Conostomum, Coscinodon, Coscinodontella, Costesia, Craspedophyllum, Cratoneurella, Cratoneuron, Cratoneuropsis, Crosbya, Crossidium, Crossomitrium, Crumia, Crumuscus, Cryhphaea, Cryphaeadelphus, Cryptocarpon, Cryptodicranum, Cryptogonium, Ctyptoleptodon, Cryptopapillaria, Cryptopodia, Cryptopodium, Cryptotheca, Ctenidiadelphus, Ctenidium, Ctenium, Cupressina, Curvicladium, Curviramea, Cyathophorella, Cyathophorum, Cyclodictyon, Cygniella, Cylicocarpus, Cynodon, Cynodontiella, Cynodontium, Cynontodium, Cyrto-hypnum, Cyrtomnium, Cyrtopodendron, Daltonia, Dasymitrium, Dawsonia, Dendro-hypnum, Dendroalsia, Dendrocyathophorum, Dendrohypopterygium, Dendroligotrichum, Dermatodon, Desmatodon, Desmotheca, Dialytrichia, Diaphanophyllum, Dichelodontium, Dichelyma, Dichodontium, Dicladiella, Dicnemoloma, Dicranella, Dicranodon, Dicranodontium, Dicranoloma, Dicranoweisia, Dicranum, Didymodon, Dimerodontium, Dimorphocladon, Diobelon, Diobelonella, Diphascum, Diphyscium, Diplocomium, Diploneuron, Diplostichum, Discelium, Discophyllum, Dissodon, Distichia, Distichium, Distichophyffidium, Distichophyllum, Ditrichopsis, Ditrichum, Dixonia, Dolichomitra, Dolichomitriopsis, Dolotortula, Donnellia, Donrichardsia, Dorcadion, Dozya, Drepanium, Drepano-hypnum, Drepanocladus, Drepanophyllaria, Drepanophyllum, Drummondia, Dryptodon, Dusenia, Duthiella, Eccremidium, Echinodiopsis, Echinodium, Echinophyllum, Ectropotheciella, Ectropotheciopsis, Ectropothecium, Eleutera, Elharveya, Elmeriobryum, Elodium, Encalypta, Endotrichella, Endotrichellopsis, Endotrichum, Entodon, Entosthodon, Entosthymenium, Eobruchia, Eohypopterygiopsis, Eoleucodon, Eosphagnum, Ephemerella, Ephemeridium, Ephemeropsis, Ephemerum, Epipterygium, Eremodon, Eriodon, Eriopus, Erpodium, Erythrobarbula, Erythrodontium, Erythrophyllastrum, Erythrophyllopsis, Erythrophyllum, Esenbeckia, Eucamptodontopsis, Eucatagonium, Eucladium, Euephemerum, Eumyurium, Euptychium, Eurhynchiadelphus, Eurhynchiastrum, Eurhynchiella, Eurhynchium, Eurohypnum, Eustichia, Euzygodon, Exodictyon, Exostratum, Exsertotheca, Fabroleskea, Fauriella, Fabronialschyrodon, Fabronidium, Fallaciella, Fauriella, Felipponea, Fiedleria, Fifealsotheciadelphus, Fissidens, Flabeffidium, Fleischerobryum, Floribundaria, Florschuetziella, Flowersia, Fontinalis, Foreauella, Forsstroemia, Frahmiella, Funaria, Funariella, Gammiella, Ganguleea, Garckea, Garovaglia, Gasterogrimmia, Geheebia, Gemmabryum, Georgia, Gertrudia, Gertrudiella, Gigaspermum, Giraldiella, Globulina, Globulinella, Glossadelphus, Glyphomitrium, Glyphomitrium, Glyphothecium, Glyptothecium, Gollania, Gongronia, Goniobryum, Goniomitrium, Gradsteinia, Grimmia, Groutiella, Guembelia, Guerramontesia, Gymnostomiella, Gymnostomum, Gyroweisia, Habrodon, Habrodonlshibaealwatsukiella, Hageniella, Hamatocaulis, Hampeella, Hampeohypnum, Handeliobryum, Haplocladium, Haplodon, Haplodontium, Haplohymenium, Haptymenium, Harpidium, Harphyllum, Harrisonia, Harveya, Hebantialtatiella, Hedenaesia, Hedenasiastrum, Hedwigia, Hedwigidium, Helicoblepharum, Helicodontiadelphus, Helicodontium, Heliconema, Helicophyllum, Helodium, Hemiragis, Henicodium, Hennediella, Herpetineuron, Herzogiella, Heterocladium, Heterodon, Heterophyffium, Hildebrandtiella, Hilpertia, Himantocladium, Holoblepharum, Holodontium, Holomitriopsis, Holomitrium, Homalia, Homaliadelphus, Homaliodendron, Homaliopsis, Homalotheciella, Homalothecium, Homomaffium, Hondaella, Hookeria, Hookeriopsis, Horikawaea, Horridohypnum, Husnotiella, Hyalophyllum, Hydrocryphaealsodrepanium, Hydrogonium, Hydropogon, Hydropogonella, Hygroamblystegium, Hygrodicranum, Hygrohypnella, Hygrohypnum, Hylocomiadelphus, Hylocomiastrum, Hylocomiopsis, Hylocomium, Hymenodon, Hymenodontopsis, Hymenoloma, Hymenostomum, Hymenostyliella, Hymenostylium, Hyocomium, Hyophila, Hyophiladelphus, Hyophilopsis, Hypnella, Hypnites, Hypnobartlettia, Hypnodendron, Hypnum, Hypodontium, Hypopterygium, Imbribryum, Indopottia, Indothuidium, Indusiella, Inouethuidium, Isopterygiopsis, Isopterygium, Isotheciopsis, Isothecium, Jaegerina, Jaegerinopsis, Jaffueliobryum, Juratzkaeella, Kiaeria, Kindbergia, Kingiobryum, Kleioweisiopsis, Koponenia, Kurohimehypnum, Lamprophyllum, Leersia, Leiodontium, Leiomela, Leiomitrium, Leiotheca, Lembophyllum, Lepidopilidium, Lepidopilum, Leptangium, Leptobarbula, Leptobryum, Leptocladiella, Leptocladium, Leptodictyum, Leptodontiella, Leptodontiopsis, Leptodontium, Leptohymenium, Leptophascum, Leptopterigynandrum, Leptostomopsis, Leptostomum, Leptotheca, Leptotrichella, Leptotrichum, Lepyrodon, Lepyrodontopsis, Leratia, Leratiella, Lescuraea, Leskea, Leskeadelphus, Leskeella, Leskeodon, Leskeodontopsis, Lesquereuxia, Leucobryum, Leucodon, Leucodontella, Leucolepis, Leucoloma, Leucomium, Leucoperichaetium, Leucophanella, Leucophanes, Levierella, Limbella, Limnobium, Limprichtia, Lindbergia, Lindigia, Loeskeobryum, Loeskypnum, Loiseaubryum, Looseria, Lophiodon, Lopidium, Lorentzia, Lorentziella, Loxotis, Ludorugbya, Luisierella, Lyeffia, Macgregorella, Macouniella, Macrocoma, Macrodictyum, Macrohymenium, Macromitrium, Macrosporiella, Macrothamniella, Macrothamnium, Mamillariella, Mandoniella, Maschalanthus, Maschalocarpus, Mastopoma, Matteria, Meesia, Meiotheciella, Meiotheciopsis, Meiothecium, Meiotrichum, Merceya, Merceyopsis, Mesochaete, Mesonodon, Mesotus, Metadistichophyllum, Metaneckera, Meteoridium, Meteoriella, Meteoriopsis, Meteorium, Metzlerella, Metzleria, Micralsopsis, Microbryum, Microcampylopus, Microcrossidium, Microctenidium, Microdus, Microeurhynchium, Micromitrium, Micropoma, Microthamnium, Microtheciella, Microthuidium, Miehea, Mielichhoferia, Mildea, Mildeella, Mironia, Mitrobryum, Mittenia, Mittenothamnium, Mitthyridium, Miyabea, Mniadelphus, Mniobryum, Mniodendron, Mniomalia, Mnium, Moenkemeyera, Molendoa, Moffia, Morinia, Moseniella, Muelleriella, Muellerobryum, Muscoflorschuetzia, Muscoherzogia, Myrinia, Myurella, Myuriopsis, Myurium, Myuroclada, Nanobryum, Nanomitriopsis, Nanomitrium, Neckera, Neckeradelphus, Neckerites, Neckeropsis, Nematocladia, Neobarbella, Neocardotia, Neodicladiella, Neodolichomitra, Neohyophila, Neolescuraea, Neolindbergia, Neomacounia, Neomeesia, Neonoguchia, Neophoenix, Neorutenbergia, Neosharpiella, Niphotrichum, Nobregaea, Nogopterium, Noguchiodendron, Notoligotrichum, Ochiobryum, Ochrobryum, Ochyraea, Octodiceras, Oedicladium, Oedipodiella, Oedipodium, Okamuraea, Oligotrichum, Oncophorus, Oreas, Oreoweisia, Orontobryum, Orthoamblystegium, Orthodicranum, Orthodon, Orthodontium, Orthodontopsis, Orthogrimmia, Orthomitrium, Orthomnion, Orthomniopsis, Orthopus, Orthopyxis, Orthorrhynchidium, Orthorrhynchium, Orthostichella, Orthostichidium, Orthostichopsis, Orthotheciella, Orthothecium, Orthothecium, Orthothuidium, Orthotrichum, Osterwaldiella, Oticodium, Oxyrrhynchium, Oxystegus, Pachyneuropsis, Pachyneurum, Palaeocampylopus, Palamocladium, Palisadula, Paludella, Palustriella, Panckowia, Pancovia, Papillaria, Papillidiopsis, Paraleucobryum, Paramyurium, Pararhacocarpus, Parisia, Pelekium, Pendulothecium, Pentastichella, Penzigiella, Peromnion, Pharomitrium, Phasconica, Phascopsis, Phascum, Phffibertiella, Philonotis, Philophyllum, Photinophyllum, Phyllodon, Phyllodrepanium, Phyllogonium, Physcomitrella, Physcomitrium, Physedium, Picobryum, Pictus, Piloecium, Pilopogon, Pilopogonella, Piloseriopus, Pilotrichella, Pilotrichidium, Pilotrichum, Pinnatella, Pirea, Pireella, Plagiobryoides, Plagiobryum, Plagiomnium, Plagiopus, Plagioracelopus, Plagiothecium, Plasteurhynchium, Platydictya, Platygyriella, Platygyrium, Platyhypnidium, Platyhypnum, Platyloma, Platylomella, Platyneuron, Plaubelia, Pleuriditrichum, Pleuridium, Pleurochaete, Pleurophascum, Pleuropus, Pleurorthotrichum, Pleuroweisia, Pleurozium, Pleurozygodon, Pocsiella, Podperaea, Poecilophyllum, Pogonatum, Pohlia, Polla, Polymerodon, Polypodiopsis, Polytrichadelphus, Polytrichastrum, Polytrichites, Polytrichum, Porothamnium, Porotrichella, Porotrichodendron, Porotrichopsis, Porotrichum, Potamium, Pottia, Pottiopsis, Poweffia, Poweffiopsis, Pringleella, Prionidium, Prionodon, Pseudatrichum, Pseudephemerum, Pseudisothecium, Pseudoamblystegium, Pseudobarbella, Pseudobraunia, Pseudobryum, Pseudocaffiergon, Pseudocampylium, Pseudochorisodontium, Pseudocrossidium, Pseudodimerodontium, Pseudodistichium, Pseudoditrichum, Pseudohygrohypnum, Pseudohyophila, Pseudohypnella, Pseudoleskea, Pseudoleskeella, Pseudoleskeopsis, Pseudopiloecium, Pseudopilotrichum, Pseudopleuropus, Pseudopohlia, Pseudopterobryum, Pseudoracelopus, Pseudorhynchostegiella, Pseudoscleropodium, Pseudosymblepharis, Pseudotimmiella, Pseudotrismegistia, Psilopilum, Pterigynandrum, Pterobryella, Pterobryidium, Pterobryon, Pterobryopsis, Pterogoniadelphus, Pterogonidium, Pterogoniella, Pterogonium, Pterygoneurum, Pterygophyllum, Ptilium, Ptychodium, Ptychomitriopsis, Ptychomitrium, Ptychomniella, Ptychomnion, Ptychostomum, Puiggaria, Puiggariella, Puiggariopsis, Pulchrinodus, Pungentella, Pursellia, Pylaisia, Pylaisiadelpha, Pylaisiella, Pylaisiobryum, Pyramidula, Pyramitrium, Pyromitrium, Pyrrhobryum, Quaesticula, Racelopodopsis, Racelopus, Racomitrium, Racopilum, Radulina, Raineria, Rauia, Rauiella, Regmatodon, Reimersia, Remyella, Renauldia, Rhabdodontium, Rhabdoweisia, Rhacocarpus, Rhacopilopsis, Rhamphidium, Rhaphidorrhynchium, Rhaphidostegium, Rhaphidostichum, Rhexophyllum, Rhizofabronia, Rhizogonium, Rhizohypnum, Rhizomnium, Rhizopelma, Rhodobryum, Rhyncho-hypnum, Rhynchostegiella, Rhynchostegiopsis, Rhynchostegium, Rhystophyllum, Rhytidiadelphus, Rhytidiastrum, Rhytidiopsis, Rhytidium, Richardsiopsis, Rigodiadelphus, Roeffia, Rosulabryum, Rottleria, Rutenbergia, Saelania, Sagenotortula, Sainthelenia, Saitoa, Saitobryum, Saitoella, Sanionia, Saproma, Sarconeurum, Sarmentypnum, Sasaokaea, Sauloma, Scabridens, Schimperella, Schimperobryum, Schistidium, Schistomitrium, Schistophyllum, Schistostega, Schizomitrium, Schizymenium, Schliephackea, Schlotheimia, Schraderobryum, Schwetschkea, Schwetschkeopsis, Sciadocladus, Sciaromiella, Sciaromiopsis, Sciaromium, Sciurohypnum, Sclerodontium, Sclerohypnum, Scleropodiopsis, Scleropodium, Scopelophila, Scorpidium, Scorpiurium, Scouleria, Scytalina, Sebillea, Sehnemobryum, Sekra, Seligeria, Sematophyffites, Sematophyllum, Semibarbula, Serpoleskea, Serpotortella, Sharpiella, Shevockia, Sigmatella, Simophyllum, Simplicidens, Sinocalliergon, Sinskea, Skitophyllum, Skottsbergia, Solmsia, Solmsiella, Sorapilla, Sphaerangium, Sphaerocephalus, Sphaerothecium, Sphagnum, Spiridentopsis, Spirula, Splachnum, Sporledera, Spruceella, Squamidium, Stableria, Steerecleus, Steereobryon, Stegonia, Stellariomnium, Stenocarpidiopsis, Stenodesmus, Stenodictyon, Stenotheciopsis, Stenothecium, Steppomitra, Stereodon, Stereodontopsis, Stereohypnum, Steyermarkiella, Stokesiella, Stonea, Stoneobryum, Straminergon, Straminergon, Streblopilum, Streblotrichum, Streimannia, Strephedium, Streptocalypta, Streptocolea, Streptopogon, Streptotrichum, Stroemia, Strombulidens, Struckia, Struckia, Stylocomium, Swartzia, Symblepharis, Symphyodon, Symphysodon, Symphysodontella, Syntrichia, Syrrhopodon, Systegium, Taiwanobryum, Takakia, Tamariscella, Taxicaulis, Taxiphyllum, Taxithelium, Tayloria, Teichodontium, Teniolophora, Teretidens, Terrestria, Tetracoscinodon, Tetraphidopsis, Tetraphis, Tetraplodon, Tetrapterum, Tetrastichium, Tetrodontium, Thamniella, Thamniopsis, Thamnium, Thamnobryum, Thamnomalia, Thelia, Thiemea, Thuidiopsis, Thuidium, Thyridium, Thysanomitrion, Timmia, Timmiella, Timokoponenia, Toloxis, Tomentypnum, Tortella, Tortula, Touwia, Touwiodendron, Trachybryum, Trachycarpidium, Trachycladiella, Trachycystis, Trachyloma, Trachymitrium, Trachyodontium, Trachyphyllum, Trachythecium, Trachyxiphium, Trematodum, Trichodon, Trichodontium, Tricholepis, Trichosteleum, Trichostomopsis, Trichostomum, Tridontium, Trigonodictyon, Tripterocladium, Triquetrella, Trismegistia, Tristichium, Tuerckheimia, Uleastrum, Uleobryum, Ulota, Unclejackia, Valdonia, Venturiella, Verrucidens, Vesicularia, Vesiculariopsis, Vetiplanaxis, Viridivellus, Vittia, Voitia, Vrolijkheidia, Warburgiella, Wardia, Wamstorfia, Webera, Weisiodon, Weisiopsis, Weissia, Weissiodicranum, Werneriobryum, Weymouthia, Wijkia, Wildia, Wiffia, Wilsoniella, Yunnanobryon, Zelometeorium, Zygodon, Zygotrichia.

According to another preferred embodiment of the use according to the invention, the, one, several or all of the plants are one or more hornwort(s) selected from the group consisting of the genera: Anthoceros, Dendroceros, Folioceros, Hattorioceros, Leiosporoceros, Megaceros, Mesoceros, Nothoceros, Notothylas, Paraphymatoceros, Phaeoceros, Phaeomegaceros, Phymatoceros, Sphaerosporoceros.

A preferred embodiment relates to a use as described herein, where the biocementation reaction is not an exothermic reaction. In the context of this text, an exothermic reaction is a reaction in which energy in the form of heat is released into the environment at constant pressure, preferably a reaction in which, at constant pressure, the temperature of the precursors, intermediates and/or products during the biocementation reaction increases by more than 5° C., more preferably by more than 10, 20, 30, 40, 50, 60, 70, 80, 90 or 100° C. (relative to the initial temperature before the start of the biocementation reaction).

Another aspect of the present invention relates to a method for preventing or reducing plant growth, preferably weed growth, on/in a substrate consisting of or comprising the following steps:
(a) Identifying a substrate to be treated on/in which plant growth, preferably weed growth, is to be prevented or reduced,
(b) providing a mixture (as defined above),
(c) applying and/or introducing the mixture provided in step (b) onto/into the substrate to be treated in an amount sufficient to enable biocementation, and
(d) forming a biocement (as defined above) layer so that plant growth or weed growth on/in the substrate is prevented or reduced.

According to a preferred embodiment of the method according to the invention, (only) an application of the mixture provided in step (b) onto/into the substrate to be treated takes place in step (c). According to another preferred embodiment of the method according to the invention, an application and subsequent introduction, for example by intermixing, of the mixture provided in step (b) onto/into the substrate to be treated takes place in step (c).

According to another preferred embodiment of the method according to the invention, (only) an introduction of the mixture provided in step (b) onto/into the substrate to be treated takes place in step (c).

According to another preferred embodiment of the method according to the invention, the substrate or parts thereof identified in step (a) is removed from the original location, mixed with the mixture provided in step (b) in an amount sufficient to enable biocementation (for example in a mixinger), the mixture obtained is returned to the original location of the substrate (or alternatively moved to another location where a biocement layer is to be formed), followed by step (d) as described herein. In such a preferred embodiment, step (c) of the method as described herein is omitted.

Depending on the form (solid or powdery or liquid or gel-like or paste-like) of the mixture provided in step (b) of the method according to the invention (cf. the explanations above for this purpose), the application and/or introduction in step (c) can take place in different ways. Powdery mixtures can, for example, be scattered onto the substrate to be treated and/or incorporated into the substrate. Liquid mixtures, for example, are poured or sprayed onto the substrate to be treated and are optionally subsequently incorporated into the substrate. Advantageously, a single application and/or introduction of the mixture provided in step (b) onto/into the substrate to be treated is usually sufficient to form a biocement layer as defined in step (d) of the method according to the invention. Preferably, a single application of the mixture provided in step (b) onto/into the substrate to be treated is sufficient to form a biocement layer as defined in step (d) of the method according to the invention.

The skilled person is thereby aware that biocementation (as defined herein) is particularly efficient in the method according to the invention at a certain application volume or a certain concentration of the mixture from step (b) (see also the preferred cell numbers of the organism or the organisms in the mixture to be used according to the invention as defined above). According to our own investigations, the application volume of the mixture to be used according to the invention (as defined above) is preferably at least 0.1 $l/m^2$, more preferably at least 0.5 $l/m^2$, more preferably at least 1.0 $l/m^2$, more preferably at least 2.0 $l/m^2$, at least 3.0 $l/m^2$, at least 4.0 $l/m^2$ or at least 5.0 $l/m^2$, and/or preferably at most 20.0 $l/m^2$, more preferably at most 10.0 $l/m^2$.

For an effective biocementation process in step (d) of the method according to the invention, it is advantageous if the system of mixture to be used according to the invention and substrate (as defined herein) has a water content of more than 10 wt. % based on the total weight of said system. If the mixture to be used according to the invention is used in powdery form (as defined above) in step (b) of the method according to the invention and if the substrate in step (a) or (c) of the method according to the invention is also essentially free from water, so that a water content of said system of 10 wt. % or less results based on the total weight of the system, it is advantageous if the method according to the invention comprises a further step in which sufficient water or aqueous solution is added to the mixture from step (b) of the method before or after application or introduction onto/into the substrate to be treated, so that a water content of said system of more than 10 wt. % based on the total weight of said system results. Alternatively or simultaneously, a corresponding amount of water or aqueous solution may be added to the substrate to be treated before or after application or introduction of the mixture provided in step (b) of the method according to the invention.

Furthermore, if the method according to the invention is used outdoors, it is advantageous not to carry out the method in case of heavy rain or wind, for example. Heavy rain or wind may potentially lead to a loss or significant dilution of the mixture to be used according to the invention already before the formation of the biocement layer (step (d)), which could prevent the formation of the biocement layer and/or negatively affect its strength and/or thickness. After the application or introduction of the mixture provided in step (b) of the method according to the invention onto/into the substrate to be treated, i.e. in step (d) of the method according to the invention, the formation of the biocement layer takes place preferably over an incubation period of at least 6 hours, preferably of at least 24 hours, more preferably of at least 48 hours, in which preferably no amount of rain or wind or artificial irrigation occurs, which leads to a significant loss of mixture to be used according to the invention. The required incubation period for the formation of the biocement layer in step (d) of the method according to the invention depends on various environmental parameters, such as room or outside temperature and humidity, and on the application volume of the mixture used. If during said incubation period of at least 6 hours, preferably of at least 24 hours, more preferably of at least 48 hours, rain or wind should cause a significant loss of mixture to be used according to the invention, it is advantageous to repeat steps (b) to (d) of the method according to the invention as often as necessary, preferably once, twice, three times or more, until a sufficient thickness and strength of the biocement layer for preventing or reducing plant growth, preferably weed growth, on/in the substrate is achieved. In addition, or alternatively, it may be advantageous to repeat steps (b) to (d) of the method according to the invention, preferably once, twice, three times or more, if the thickness and/or strength of the biocement layer formed on/in the substrate decreases over time due to weathering and/or natural degradation and is thereby no longer sufficient to prevent or reduce plant growth, preferably weed growth, on/in the substrate.

The thickness of the biocement layer can be determined by manual measurement after mechanical breakage of the layer using a caliper gauge. Alternatively, different (non-destructive) measuring methods from construction, agriculture, geology or other fields of application can be used (e.g. hand-held device MIT-SCAN-T2) depending on the thickness of the solidification. The layer thickness of the biocement layer comprises the area of the substrate that is solidified by the addition of the mixture.

The strength of the biocement layer corresponds to the breaking force (in Newton (N)) that must be applied to break the biocement layer. The breaking of the biocementation layer is the point at which (plastic) deformation of the layer does not occur any longer under the application of force, but the breakthrough of the (biocementation) layer occurs. One recognizes the breaking by a decrease of the measured force. The breaking force (maximum value of the force measurement) can be determined using the following method: The method is based on the standardized test method for strength determination in cement DIN EN 196-1:2005-05. According to the manufacturer, the breaking force is measured using a digital (breaking) force instrument. A test piece is pressed into the specimen (until breakage) with the aid of a crank test stand and the applied force is continuously measured. The average breaking force is calculated from several measurements (>3). The average breaking force is preferably between 0.5 and 1000 N, further preferred between 3 and 300 N.

A method as described herein is also preferred, wherein the biocement layer formed (in step (d) of the method according to the invention) has a (water) coefficient of permeability of greater than $10^{-9}$ to $10^0$ m/s, preferably greater than $10^{-9}$ to $10^{-3}$ m/s, further preferably greater than $10^{-8}$ to $10^{-3}$ m/s.

Optionally, after step (d) of the method according to the invention, a further step (e) may take place which comprises or consists of controlling whether plant growth, preferably weed growth, has been prevented or reduced. Said control may be carried out, for example, by determining the coverage rate of the plant or weed growth by manual visual assessment as described in the following examples. Step (e) of the method according to the invention may be repeated at regular intervals, if needed, e.g. every 24 or 48 hours.

A method as described above is preferred, wherein the substrate is selected from the group consisting of sand, soil, preferably land soil and plant soil, humus, crushed stone, gravel, clay, silt, sawdust, paper, cardboard, chipboard, softwood, limestone, coal and mixtures thereof.

Further preferably the substrate used in the method according to the invention is selected from the group consisting of organic and inorganic material and mixtures thereof in which plant growth is possible, preferably cable sand, fine sand, natural sand, quartz sand, crystal quartz sand, bird sand, gravel sand, joint sand, crushed sand, quartz flour, mineral mixture (stone, chippings, gravel), triple hell, savonniere stone flour, plaster, loess, topsoil, limestone crushed sand, limestone flour, calcium carbonate (incl. polymorphs, derivatives and mixtures, as well as naturally based (GCC ground calcium carbonate) as well as synthetic PCC (precipitated calcium carbonate)), talc, dolomite, white lime (hydrate), trass, cements and mixtures, microsilicates, chalk (mixture), marble, pearlite, overburden, heap material, hematite, red chalk, magnesite, iron ore, steatite, soapstone, kaolin, marl, alumina, attapulgite, clay minerals, bentonite, zeolite, (calco)stucco, gravel, glass powder, aluminium oxide, aluminium hydroxide, magnesium oxide, calcium oxide, calcium hydroxide, magnesite, slate powder, pumice stone, cristobalite (sand), roman cement, bauxite, pyrites, sphalerites, silicates, oxides, carbonates, wood (chips), mulch, alluvial soil, laterite, haematite, ash, (wood ash, fly ash, bone ash), (pig) farm soils, LUFA standard soils (see e.g. http:/www.lufa-speyer.de/ or mixtures thereof.

A method as described above is further preferred, wherein the substrate is a ground area or acreage, preferably in the open, such as for example a (home) garden area, a joint area of terraces or entrances and exits, an arable area, an orchard, a vineyard area, a tree nursery area, a park, a part of a developed land or urban area, a road, a street, a footpath, a railway line or an industrially used area.

Depending on the properties of the substrate to be treated, it may be advantageous to add one or several of the above additives to the substrate (or component (i), (ii) and/or (iii) of the mixture provided in step (b)), for example to improve the reactivity of the substrate with the biocement formed during the method according to the invention. This advantageously leads to a particularly hard or stable biocement layer, which suppresses weed growth particularly effectively.

The method according to the invention makes it possible, for example, to close and/or harden joint surfaces of terraces, entrances and exits, driveways, roads or footpaths or open areas with the aid of the biocementation, thus effectively suppressing the growth of plants, preferably weeds, in/on these substrates. It is also possible to apply the method according to the invention to weed suppression in agriculture, for example on farmland used for grain or fruit farming.

A preferred embodiment therefore relates to a method according to the invention as described herein, wherein the biocement layer formed in step (d) allows the (further) growth of cultivated plants, but prevents or reduces the growth of new weeds.

A method as described above is preferred, wherein the plant or weed is selected from the group consisting of dicotyls of the genera: *Abutilon, Aegopodium, Aethusa, Amaranthus, Ambrosia, Anachusa, Anagallis, Anoda, Anthemis, Aphanes, Arabidopsis, Atriplex, Barbarea, Bellis, Bidens, Bunias, Capsella, Carduus, Cassia, Centaurea, Chenopodium, Chrysanthemum, Cirsium, Conium, Conyza, Consolida, Convolvulus, Datura, Descurainia, Desmodium, Emex, Equisetum, Erigeron, Erodium, Erysimum, Euphorbia, Fumaria, Galeopsis, Galinsoga, Galium, Geranium, Heracleum, Hibiscus, Ipomoea, Kochia, Lamium, Lapsana, Lathyrus, Lepidium, Lithospermum, Linaria, Lindernia, Lycopsis, Malva, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Sisymbrium, Solanum, Sonchus, Sphenoclea, Stachys, Stellaria, Taraxacum, Thlaspi, Trifolium, Tussaligo, Urtica, Veronica, Viola, Xanthium*; dicotyls of the genera: *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia*; monocotyls of the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Juncus, Leptochloa, Lolium, Monochoria, Panicum, Paspalum, Phalaris, Phleum, Poa, Rottboellia, Sagittaria, Scirpus, Setaria, Sorghum*; and monocotyls of the genera: *Allium, Ananas, Asparagus, Avena, Hordeum, Oryza, Panicum, Saccharum, Secale, Sorghum, Triticale, Triticum, Zea*; mosses of the lineages liverworts (Marchentiosida), hornworts (Anthocerotopsida), mosses (bryopsida).

According to a preferred embodiment of the method according to the invention, the, one, several or all of the plants are one or more liverwort(s) selected from the group consisting of the genera: *Acolea, Acrobolbus, Acrochila, Acromastigum, Acroscyphella, Acroscyphus, Acrostolia, Adelocolia, Aitchisoniella, Alicularia, Ansonia, Allisoniella, Alobiella, Alobiellopsis, Amazoopsis, Amphicephalozia, Amphilophocolea, Andrewsianthus, Aneura, Anomacaulis, Anomoclada, Anomylia, Anthelia, Anthelis, Aphanolejeunea, Aplozia, Apomarsupella, Apometzgeria, Apotreubia, Arachniopsis, Arctoscyphus, Amelia, Ascidiota, Asterella, Athalamia, Austrofossombronia, Austrolembidium, Austrolophozia, Austrometzgeria, Austroscyphus, Balantiopsis, Bazzania, Blasia, Blepharidophyllum, Blepharostoma, Brevianthus, Calycularia, Calypogeia, Calyptrocolea, Campanocolea, Castanoclobos, Cavicularia, Cephalojonesia, Cephalolobus, Cephalomitrion, Cephalozia, Cephaloziella, Cephaloziopsis, Ceratolejeunea, Cesius, Chaetophyllopsis, Chiastocaulon, Chiloscyphus, Chloranthelia, Chonecolea, Cladomastigum, Cladopodiella, Clandarium, Clasmatocolea, Cololejeunea, Colura, Conocephalum, Conoscyphus, Corsinia, Cronisia, Crossogyna, Cryptochila, Ctyptocolea, Cryptocoleopsis, Cryptomitrium, Cryptostipula, Cryptothallus, Cuspidatula, Cyanolophocolea, Cyathodium, Cylindrocolea, Delavayella, Dendrobazzania, Dendromastigophora, Denotarisia, Dichiton, Dinckleria, Diplocolea, Diplophyllum, Douinia, Drepanolejeunea, Drucella, Dumortiera, Dumortieropsis, Enigmella, Eocalypogeia, Eoisotachis, Eopleurozia, Eotrichocolea, Eremonotus, Eucalyx, Evansia, Evansianthus, Exormotheca, Fossombronia, Frullania, Fuscocephaloziopsis, Gackstroemia, Geocalyx, Geothallus, Gerhildiella, Goebeliella, Goebelobryum, Gongylanthus, Gottschea, Gottschelia, Greeneothallus, Grollea, Gymnan-* the, Gymnocoleopsis, Gymnomitrion, Gymnoscyphus, Gyrothyra, Haesselia, Haplomitrium, Harpalejeunea, Harpanthus, Hattoria, Hattorianthus, Hattoriella, Hepatostolonophora, Herbertus, Herpetium, Herpocladium, Herzogianthus, Herzogobryum, Heterogemma, Heteroscyphus, Horikawaella, Hyalolepidozia, Hygrobiellalwatsukia, Hygrolembidium, Hygrophila, Hymenophyton, Hypoisotachis, Isolembidium, Isotachis, Jamesoniella, Jensenia, Jubula, Jubulopsis, Jungermannia, Jungermannites, Krunodiplophyllum, Kurzia, Kymatocalyx, Lamellocolea, Leiocolea, Leiomitra, Leiomylia, Leioscyphus, Lejeunea, Lembidium, Lepidogyna, Lepidolaena, Lepidozia, Leptolejeunea, Leptophyllopsis, Leptoscyphopsis, Leptoscyphus, Lethocolea, Liochlaena, Lobatiriccardia, Lophocolea, Lophonardia, Lophozia, Lophoziopsis, Lunularia, Macrodiplophyllum, Maculia, Makinoa, Mannia, Marchantia, Marchesinia, Marsupella, Marsupidium, Massula, Massularia, Mastigobryum, Mastigopelma, Mastigophora, Mastigopsis, Mesoptychia, Metacalypogeia, Metahygrobiella, Metzgeria, Metzgeriopsis, Micrisophylla, Microlejeunea, Microlepidozia, Micropterygium, Mizutania, Mnioloma, Moerckia, Monocarpus, Monoclea, Monodactylopsis, Monosolenium, Mytilopsis, Nanomarsupella, Nardia, Neesioscyphus, Neogrollea, Neohodgsonia, Neotrichocolea, Noteroclada, Nothogymnomitrion, Nothostrepta, Notoscyphus, Noweffia, Obtusifolium, Odontolejeunea, Odontoschisma, Oleolophozia, Oxymitra, Pachyglossa, Pachyschistochila, Pallavicinia, Paracromastigum, Paraschistochila, Patarola, Pedinophyllopsis, Pedinophyllum, Peffia, Peltolepsis, Perdusenia, Perssoniella, Petalophyllum, Phycolepidozia, Phyllothaffia, Physiotium, Physotheca, Pisanoa, Plagiochasma, Plagiochila, Plagiochilidium, Plagiochilion, Platycaulis, Plectocolea, Pleuranthe, Pleuroclada, Pleurocladopsis, Pleurocladula, Pleurozia, Podanthe, Podomitrium, Porella, Prasanthus, Preissia, Prionolobus, Protolophozia, Protomarsupella, Protosyzgiella, Protosyzygiella, Pseudocephalozia, Pseudocephaloziella, Pseudolophocolea, Pseudolophozia, Pseudomarsupidium, Pseudoneura, Pseudotritomaria, Psilioclada, Pteropsiella, Ptilidium, Radula, Reboulia, Rhizocaulia, Rhodoplagiochila, Riccardia, Riccia, Ricciella, Ricciocarpos, Riella, Roivainenia, Ruizanthus, Ruttnerella, Saccobasis, Saccogyna, Sandeothallus, Sarcocyphos, Sarcomitrium, Sauteria, Scapania, Scaphophyllum, Schiffneria, Schisma, Schistochila, Schistochilaster, Schistochilopsis, Schofieldia, Sendtnera, Seppeltia, Sewardiella, Simodon, Solenostoma, Southbya, Sphaerocarpos, Sphagnoecetis, Sprucella, Steereella, Steereocolea, Stenorrhipis, Stephandium, Stephaniella, Stephaniellidium, Stephensoniella, Symphyogyna, Symphyogynopsis, Symphyomitra, Synhymenium, Syzygiella, Taeniolejeunea, Targionia, Tegulifolium, Telaranea, Thallocarpus, Treubia, Triandrophyllum, Trichocolea, Trichocoleopsis, Trichostylium, Trichotemnoma, Trilophozia, Tritomaria, Tylimanthus, Vanaea, Vandiemenia, Verdoornia, Vetaforma, Wettsteinia, Wiesnerella, Xenochila, Xenothallus, Zoopsidella, Zoopsis.

According to a further preferred embodiment of the method according to the invention, the, one, several or all of the plants are one or more moss(es) selected from the group consisting of the genera: Abietinella, Acanthocladiella, Acanthocladium, Acanthodium, Acanthorrhynchium, Acaulon, Acaulonopsis, Achrophyllum, Acidodontium, Acrocladium, Acroporium, Acroschisma, Actinodontium, Actinothuidium, Adelothecium, Aequatoriella, Aerobryidium, Aerobryopsis, Aerobryum, Aerolindigia, Algaria, Aligrimmia, Alleniella, Allionellopsis, Aloina, Aloinella, Alophosia, Alsia, Amblyodon, Amblyodum, Amblystegiella, Amblystegium, Amblytropis, Ambuchanania, Amphidium, Amphoridium, Amphoritheca, Anacalypta, Anacamptodon, Anacolia, Ancistrodes, Andoa, Andreaea, Andreaeobryum, Anictangium, Anisothecium, Anodon, Anodontium, Anoectangium, Anomobryum, Anomodon, Antitrichia, Aongstroemia, Aongstroemiopsis, Apalodium, Aphanorrhegma, Apiocarpa, Aplodon, Apterygium, Aptychella, Aptychopsis, Aptychus, Arbuscula, Arbusculohypopterygium, Archephemeropsis, Archidium, Arctoa, Argyrobryum, Arthrocormus, Aschisma, Aschistodon, Asteriscium, Astomiopsis, Astomum, Astrodontium, Astrophyllum, Atractylocarpus, Atrichopsis, Atrichum, Aulacomitrium, Aulacomnium, Aulacopilum, Austinella, Austrohondaella, Austrophilibertiella, Baldwiniella, Barbella, Barbellopsis, Barbula, Bartramia, Bartramiopsis, Beeveria, Bellibarbula, Benitotania, Bestia, Bissetia, Blindia, Boulaya, Brachelyma, Brachydontium, Brachymenium, Brachymitrion, Brachyodus, Brachysteleum, Brachytheciastrum, Brachytheciella, Brachythecium, Brachytrichum, Braithwaitea, Braunfelsia, Braunia, Breidleria, Breutelia, Brothera, Brotherella, Brotherobryum, Bruchia, Bothnia, Brymela, Bryoandersonia, Bryobeckettia, Bryobrittonia, Bryobrothera, Botoceuthospora, Bryochenea, Bryocrumia, Bryodixonia, Bryodusenia, Botoerythrophyllum, Botohaplocladium, Bryohumbertia, Bryomaltaea, Bryomanginia, Botomnium, Bryonoguchia, Bryonorrisia, Bryophixia, Bryosedgwickia, Botostreimannia, Bryotestua, Bryum, Buckiella, Bucklandiella, Burnettia, Buxbaumia, Callialaria, Callicladium, Callicosta, Callicostella, Cafficostellopsis, Caffiergidium, Calliergon, Calohypnum, Calymperastrum, Calymperes, Calymperidium, Calymperopsis, Calyptopogon, Calyptothecium, Calyptrochaeta, Camptochaete, Camptodontium, Camptothecium, Campyliadelphus, Campylidium, Campylium, Campylodontium, Campylophyllum, Campylopodiella, Campylopodium, Campylopus, Campylostelium, Canalohypopterygium, Cardotia, Cardotiella, Caribaeohypnum, Catagoniopsis, Catagonium, Catharinea, Catharinella, Catharomnion, Catoscopium, Cecalyphum, Ceratodon, Ceuthospora, Ceuthotheca, Chaetomitrella, Chaetomitriopsis, Chaetomitrium, Chaetophora, Chamaebryum, Chamberlainia, Chameleion, Cheilothela, Chenia, Chileobryon, Chionoloma, Chionostomum, Chorisodontium, Chryso-hypnum, Chrysoblastella, Chrysocladium, Chrysohypnum, Cinclidium, Circulifolium, Cirriphyllum, Cladastomum, Cladomnion, Cladophascum, Cladopodanthus, Cladopodanthus, Claopodium, Clasmatodon, Clastobryella, Clastobryophilum, Clastobryopsis, Clastobryum, Clavitheca, Cleistocarpidium, Cleistostoma, Climacium, Cnestrum, Codonoblepharon, Codonoblepharum, Codriophorus, Coelidium, Coleochaetium, Colobodontium, Conardia, Conomitrium, Conostomum, Coscinodon, Coscinodontella, Costesia, Craspedophyllum, Cratoneurella, Cratoneuron, Cratoneuropsis, Crosbya, Crossidium, Crossomitrium, Crumia, Crumuscus, Cryhphaea, Cryphaeadelphus, Cryptocarpon, Cryptodicranum, Cryptogonium, Ctyptoleptodon, Cryptopapillaria, Cryptopodia, Cryptopodium, Cryptotheca, Ctenidiadelphus, Ctenidium, Ctenium, Cupressina, Curvicladium, Curviramea, Cyathophorella, Cyathophorum, Cyclodictyon, Cygniella, Cylicocarpus, Cynodon, Cynodontiella, Cynodontium, Cynontodium, Cyrto-hypnum, Cyrtomnium, Cyrtopodendron, Daltonia, Dasymitrium, Dawsonia, Dendro-hypnum, Dendroalsia, Dendrocyathophorum, Dendrohypopterygium, Dendroligotrichum, Dermatodon, Desmatodon, Desmotheca, Dialytrichia, Diaphanophyllum, Dichelodontium, Dichelyma, Dichodontium, Dicladiella, Dicnemoloma, Dicranella, Dicranodon, Dicranodontium, Dicranoloma, Dicranoweisia, Dicranum,

*Didymodon, Dimerodontium, Dimorphocladon, Diobelon, Diobelonella, Diphascum, Diphyscium, Diplocomium, Diploneuron, Diplostichum, Discelium, Discophyllum, Dissodon, Distichia, Distichium, Distichophyffidium, Distichophyllum, Ditrichopsis, Ditrichum, Dixonia, Dolichomitra, Dolichomitriopsis, Dolotortula, Donnellia, Donrichardsia, Dorcadion, Dozya, Drepanium, Drepano-hypnum, Drepanocladus, Drepanophyllaria, Drepanophyllum, Drummondia, Dryptodon, Dusenia, Duthiella, Eccremidium, Echinodiopsis, Echinodium, Echinophyllum, Ectropotheciella, Ectropotheciopsis, Ectropothecium, Eleutera, Elharveya, Elmeriobryum, Elodium, Encalypta, Endotrichella, Endotrichellopsis, Endotrichum, Entodon, Entosthodon, Entosthymenium, Eobruchia, Eohypopterygiopsis, Eoleucodon, Eosphagnum, Ephemerella, Ephemeridium, Ephemeropsis, Ephemerum, Epipterygium, Eremodon, Eriodon, Eriopus, Erpodium, Erythrobarbula, Erythrodontium, Erythrophyllastrum, Erythrophyllopsis, Erythrophyllum, Esenbeckia, Eucamptodontopsis, Eucatagonium, Eucladium, Euephemerum, Eumyurium, Euptychium, Eurhynchiadelphus, Eurhynchiastrum, Eurhynchiella, Eurhynchium, Eurohypnum, Eustichia, Euzygodon, Exodictyon, Exostratum, Exsertotheca, Fabroleskea, Fabronialschyrodon, Fabronidium, Fallaciella, Fauriella, Felipponea, Fiedleria, Fifealsotheciadelphus, Fissidens, Flabellidium, Fleischerobryum, Floribundaria, Florschuetziella, Flowersia, Fontinalis, Foreauella, Forsstroemia, Frahmiella, Funaria, Funariella, Gammiella, Ganguleea, Garckea, Garovaglia, Gasterogrimmia, Geheebia, Gemmabryum, Georgia, Gertrudia, Gertrudiella, Gigaspermum, Giraldiella, Globulina, Globulinella, Glossadelphus, Glyphomitrium, Glyphomitrium, Glyphothecium, Glyptothecium, Gollania, Gongronia, Goniobryum, Goniomitrium, Gradsteinia, Grimmia, Groutiella, Guembelia, Guerramontesia, Gymnostomiella, Gymnostomum, Gyroweisia, Habrodon, Habrodonlshibaealwatsukiella, Hageniella, Hamatocaulis, Hampeella, Hampeohypnum, Handeliobryum, Haplocladium, Haplodon, Haplodontium, Haplohymenium, Haptymenium, Harpidium, Harpophyllum, Harrisonia, Harveya, Hebantialtatiella, Hedenaesia, Hedenasiastrum, Hedwigia, Hedwigidium, Helicoblepharum, Helicodontiadelphus, Helicodontium, Heliconema, Helicophyllum, Helodium, Hemiragis, Henicodium, Hennediella, Herpetineuron, Herzogiella, Heterocladium, Heterodon, Heterophyffium, Hildebrandtiella, Hilpertia, Himantocladium, Holoblepharum, Holodontium, Holomitriopsis, Holomitrium, Homalia, Homaliadelphus, Homaliodendron, Homaliopsis, Homalotheciella, Homalothecium, Homomallium, Hondaella, Hookeria, Hookeriopsis, Horikawaea, Horridohypnum, Husnotiella, Hyalophyllum, Hydrocryphaealsodrepanium, Hydrogonium, Hydropogon, Hydropogonella, Hygroamblystegium, Hygrodicranum, Hygrohypnella, Hygrohypnum, Hylocomiadelphus, Hylocomiastrum, Hylocomiopsis, Hylocomium, Hymenodon, Hymenodontopsis, Hymenoloma, Hymenostomum, Hymenostyliella, Hymenostylium, Hyocomium, Hyophila, Hyophiladelphus, Hyophilopsis, Hypnella, Hypnites, Hypnobartlettia, Hypnodendron, Hypnum, Hypodontium, Hypopterygium, Imbribryum, Indopottia, Indothuidium, Indusiella, Inouethuidium, Isopterygiopsis, Isopterygium, Isotheciopsis, Isothecium, Jaegerina, Jaegerinopsis, Jaffueliobryum, Juratzkaeella, Kiaeria, Kindbergia, Kingiobryum, Kleioweisiopsis, Koponenia, Kurohimehypnum, Lamprophyllum, Leersia, Leiodontium, Leiomela, Leiomitrium, Leiotheca, Lembophyllum, Lepidopilidium, Lepidopilum, Leptangium, Leptobarbula, Leptobryum, Leptocladiella, Leptocladium, Leptodictyum, Leptodontiella, Leptodontiopsis, Leptodontium, Leptohymenium, Leptophascum, Leptopterigynandrum, Leptostomopsis, Leptostomum, Leptotheca, Leptotrichella, Leptotrichum, Lepyrodon, Lepyrodontopsis, Leratia, Leratiella, Lescuraea, Leskea, Leskeadelphus, Leskeella, Leskeodon, Leskeodontopsis, Lesquereuxia, Leucobryum, Leucodon, Leucodontella, Leucolepis, Leucoloma, Leucomium, Leucoperichaetium, Leucophanella, Leucophanes, Levierella, Limbella, Limnobium, Limprichtia, Lindbergia, Lindigia, Loeskeobryum, Loeskypnum, Loiseaubryum, Looseria, Lophiodon, Lopidium, Lorentzia, Lorentziella, Loxotis, Ludorugbya, Luisierella, Lyeffia, Macgregorella, Macouniella, Macrocoma, Macrodictyum, Macrohymenium, Macromitrium, Macrosporiella, Macrothamniella, Macrothamnium, Mamillariella, Mandoniella, Maschalanthus, Maschalocarpus, Mastopoma, Matteria, Meesia, Meiotheciella, Meiotheciopsis, Meiothecium, Meiotrichum, Merceya, Merceyopsis, Mesochaete, Mesonodon, Mesotus, Metadistichophyllum, Metaneckera, Meteoridium, Meteoriella, Meteoriopsis, Meteorium, Metzlerella, Metzleria, Micralsopsis, Microbryum, Microcampylopus, Microcrossidium, Microctenidium, Microdus, Microeurhynchium, Micromitrium, Micropoma, Microthamnium, Microtheciella, Microthuidium, Miehea, Mielichhoferia, Mildea, Mildeella, Mironia, Mitrobryum, Mittenia, Mittenothamnium, Mitthyridium, Miyabea, Mniadelphus, Mniobryum, Mniodendron, Mniomalia, Mnium, Moenkemeyera, Molendoa, Moffia, Morinia, Moseniella, Muelleriella, Muellerobryum, Muscoflorschuetzia, Muscoherzogia, Myrinia, Myurella, Myuriopsis, Myurium, Myuroclada, Nanobryum, Nanomitriopsis, Nanomitrium, Neckera, Neckeradelphus, Neckerites, Neckeropsis, Nematocladia, Neobarbella, Neocardotia, Neodicladiella, Neodolichomitra, Neohyophila, Neolescuraea, Neolindbergia, Neomacounia, Neomeesia, Neonoguchia, Neophoenix, Neorutenbergia, Neosharpiella, Niphotrichum, Nobregaea, Nogopterium, Noguchiodendron, Notoligotrichum, Ochiobryum, Ochrobryum, Ochyraea, Octodiceras, Oedicladium, Oedipodiella, Oedipodium, Okamuraea, Oligotrichum, Oncophorus, Oreas, Oreoweisia, Orontobryum, Orthoamblystegium, Orthodicranum, Orthodon, Orthodontium, Orthodontopsis, Orthogrimmia, Orthomitrium, Orthomnion, Orthomniopsis, Orthopus, Orthopyxis, Orthorrhynchidium, Orthorrhynchium, Orthostichella, Orthostichidium, Orthostichopsis, Orthotheciella, Orthothecium, Orthothuidium, Orthotrichum, Osterwaldiella, Oticodium, Oxyrrhynchium, Oxystegus, Pachyneuropsis, Pachyneurum, Palaeocampylopus, Palamocladium, Palisadula, Paludella, Palustriella, Panckowia, Pancovia, Papillaria, Papillidiopsis, Paraleucobryum, Paramyurium, Pararhacocarpus, Parisia, Pelekium, Pendulothecium, Pentastichella, Penzigiella, Peromnion, Pharomitrium, Phasconica, Phascopsis, Phascum, Philibertiella, Philonotis, Philophyllum, Photinophyllum, Phyllodon, Phyllodrepanium, Phyllogonium, Physcomitrella, Physcomitrium, Physedium, Picobryum, Pictus, Piloecium, Pilopogon, Pilopogonella, Piloseriopus, Pilotrichella, Pilotrichidium, Pilotrichum, Pinnatella, Pirea, Pireella, Plagiobryoides, Plagiobryum, Plagiomnium, Plagiopus, Plagioracelopus, Plagiothecium, Plasteurhynchium, Platydictya, Platygyriella, Platygyrium, Platyhypnidium, Platyhypnum, Platyloma, Platylomella, Platyneuron, Plaubelia, Pleuriditrichum, Pleuridium, Pleurochaete, Pleurophascum, Pleuropus, Pleurorthotrichum, Pleuroweisia, Pleurozium, Pleurozygodon, Pocsiella, Podperaea, Poecilophyllum, Pogonatum, Pohlia, Polla, Polymerodon, Polypodiopsis, Polytrichadelphus, Polytrichastrum, Polytrichites, Polytrichum, Porothamnium, Porotrichella, Porotrichodendron, Porotrichopsis, Porotrichum,*

*Potamium, Pottia, Pottiopsis, Poweffia, Poweffiopsis, Pringleella, Prionidium, Prionodon, Pseudatrichum, Pseudephemerum, Pseudisothecium, Pseudoamblystegium, Pseudobarbella, Pseudobraunia, Pseudobryum, Pseudocaffiergon, Pseudocampylium, Pseudochorisodontium, Pseudocrossidium, Pseudodimerodontium, Pseudodistichium, Pseudoditrichum, Pseudohygrohypnum, Pseudohyophila, Pseudohypnella, Pseudoleskea, Pseudoleskeella, Pseudoleskeopsis, Pseudopiloecium, Pseudopilotrichum, Pseudopleuropus, Pseudopohlia, Pseudopterobryum, Pseudoracelopus, Pseudorhynchostegiella, Pseudoscleropodium, Pseudosymblepharis, Pseudotimmiella, Pseudotrismegistia, Psilopilum, Pterigynandrum, Pterobryella, Pterobryidium, Pterobryon, Pterobryopsis, Pterogoniadelphus, Pterogonidium, Pterogoniella, Pterogonium, Pterygoneurum, Pterygophyllum, Ptilium, Ptychodium, Ptychomitriopsis, Ptychomitrium, Ptychomniella, Ptychomnion, Ptychostomum, Puiggaria, Puiggariella, Puiggariopsis, Pulchrinodus, Pungentella, Pursellia, Pylaisia, Pylaisiadelpha, Pylaisiella, Pylaisiobryum, Pyramidula, Pyramitrium, Pyromitrium, Pyrrhobryum, Quaesticula, Racelopodopsis, Racelopus, Racomitrium, Racopilum, Radulina, Raineria, Rauia, Rauiella, Regmatodon, Reimersia, Remyella, Renauldia, Rhabdodontium, Rhabdoweisia, Rhacocarpus, Rhacopilopsis, Rhamphidium, Rhaphidorrhynchium, Rhaphidostegium, Rhaphidostichum, Rhexophyllum, Rhizofabronia, Rhizogonium, Rhizohypnum, Rhizomnium, Rhizopelma, Rhodobryum, Rhyncho-hypnum, Rhynchostegiella, Rhynchostegiopsis, Rhynchostegium, Rhystophyllum, Rhytidiadelphus, Rhytidiastrum, Rhytidiopsis, Rhytidium, Richardsiopsis, Rigodiadelphus, Roeffia, Rosulabryum, Rottleria, Rutenbergia, Saelania, Sagenotortula, Sainthelenia, Saitoa, Saitobryum, Saitoella, Sanionia, Saproma, Sarconeurum, Sarmentypnum, Sasaokaea, Sauloma, Scabridens, Schimperella, Schimperobryum, Schistidium, Schistomitrium, Schistophyllum, Schistostega, Schizomitrium, Schizymenium, Schliephackea, Schlotheimia, Schraderobryum, Schwetschkea, Schwetschkeopsis, Sciadocladus, Sciaromiella, Sciaromiopsis, Sciaromium, Sciurohypnum, Sclerodontium, Sclerohypnum, Scleropodiopsis, Scleropodium, Scopelophila, Scorpidium, Scorpiurium, Scouleria, Scytalina, Sebillea, Sehnemobryum, Sekra, Seligeria, Sematophyffites, Sematophyllum, Semibarbula, Serpoleskea, Serpotortella, Sharpiella, Shevockia, Sigmatella, Simophyllum, Simplicidens, Sinocalliergon, Sinskea, Skitophyllum, Skottsbergia, Solmsia, Solmsiella, Sorapilla, Sphaerangium, Sphaerocephalus, Sphaerothecium, Sphagnum, Spiridentopsis, Spirula, Splachnum, Sporledera, Spruceella, Squamidium, Stableria, Steerecleus, Steereobryon, Stegonia, Stellariomnium, Stenocarpidiopsis, Stenodesmus, Stenodictyon, Stenotheciopsis, Stenothecium, Steppomitra, Stereodon, Stereodontopsis, Stereohypnum, Steyermarkiella, Stokesiella, Stonea, Stoneobryum, Straminergon, Straminergon, Streblopilum, Streblotrichum, Streimannia, Strephedium, Streptocalypta, Streptocolea, Streptopogon, Streptotrichum, Stroemia, Strombulidens, Struckia, Struckia, Stylocomium, Swartzia, Symblepharis, Symphyodon, Symphysodon, Symphysodontella, Syntrichia, Syrrhopodon, Systegium, Taiwanobryum, Takakia, Tamariscella, Taxicaulis, Taxiphyllum, Taxithelium, Tayloria, Teichodontium, Teniolophora, Teretidens, Terrestria, Tetracoscinodon, Tetraphidopsis, Tetraphis, Tetraplodon, Tetrapterum, Tetrastichium, Tetrodontium, Thamniella, Thamniopsis, Thamnium, Thamnobryum, Thamnomalia, Thelia, Thiemea, Thuidiopsis, Thuidium, Thyridium, Thysanomitrion, Timmia, Timmiella, Timokoponenia, Toloxis, Tomentypnum, Tortella, Tortula, Touwia, Touwiodendron, Trachybryum, Trachycarpidium, Trachycladiella, Trachycystis, Trachyloma, Trachymitrium, Trachyodontium, Trachyphyllum, Trachythecium, Trachyxiphium, Trematodum, Trichodon, Trichodontium, Tricholepis, Trichosteleum, Trichostomopsis, Trichostomum, Tridontium, Trigonodictyon, Tripterocladium, Triquetrella, Trismegistia, Tristichium, Tuerckheimia, Uleastrum, Uleobryum, Ulota, Unclejackia, Valdonia, Venturiella, Verrucidens, Vesicularia, Vesiculariopsis, Vetiplanaxis, Viridivellus, Vittia, Voitia, Vrolijkheidia, Warburgiella, Wardia, Wamstorfia, Webera, Weisiodon, Weisiopsis, Weissia, Weissiodicranum, Werneriobryum, Weymouthia, Wijkia, Wildia, Wiffia, Wilsoniella, Yunnanobryon, Zelometeorium, Zygodon, Zygotrichia.*

According to another preferred embodiment of the method according to the invention, the, one, several or all plants are one or more hornwort(s) selected from the group consisting of the genera: *Anthoceros, Dendroceros, Folioceros, Hattorioceros, Leiosporoceros, Megaceros, Mesoceros, Nothoceros, Notothylas, Paraphymatoceros, Phaeoceros, Phaeomegaceros, Phymatoceros, Sphaerosporoceros.*

Further preferred is a method as described above, wherein the mixture is present in liquid form, as a gel, paste or powder (see above).

The mixture provided in step (b) of the method according to the invention may therefore be in the form of a mixture, preferably in powder form, or in the form of two, three, four or more liquid and/or gel-like and/or paste-like and/or powdery pre-mixtures which are present separately from each other and which are mixed together before or during the application or introduction onto/into the substrate to be treated in step (c).

Advantageously, it is normally sufficient to carry out steps (b) to (d) of the method according to the invention once to guarantee satisfactory weed suppression.

However, according to a further embodiment, steps (b) to (d) or (b) and (c) can be repeated once, twice, three times or more as required to guarantee a particularly effective biocementation of the substrate to be treated and thus a particularly effective weed suppression.

Optionally, according to a further embodiment, one or several further method steps may be carried out prior to the application or introduction of the mixture provided in step (b) onto/into the substrate to be treated (as identified in step (a) of the method according to the invention), such as, for example, the flaming of plants, preferably weeds, located on/in the substrate, manual removal (weeding) of plants, preferably weeds, located on/in the substrate, and/or the treatment of the plants, preferably weeds, located on/in the substrate, with chemical weed control agents. These prior steps can also be repeated once, twice, three times or more, respectively.

A preferred embodiment relates to a method as described herein, wherein the formation of a biocement layer in step (d) of the method does not comprise an exothermic reaction (as defined herein).

According to a preferred embodiment of the method according to the invention, a step of removing the substrate identified in step (a) on/in which plant growth, preferably weed growth, is to be prevented or reduced, is not necessary to prevent or reduce plant growth and thus preferably is not part of a method according to the invention, in particular since it is precisely a solidification and/or hardening of the substrate during the formation of the biocement layer in step (d) of the method that causes the prevention or reduction of plant growth, preferably of weed growth.

Furthermore, within the framework of the method according to the invention as described herein, advantageously no step of compacting the substrate on/in which the plant growth is to be reduced or prevented, or of the biocement layer formed, is necessary to achieve a prevention or reduction of plant growth, preferably of the growth of weeds, and thus is preferably not part of a method according to the invention.

What is stated herein for a use according to the invention also applies to a method according the invention as described herein and vice versa. This applies in particular to (preferred) embodiments of the use according to the invention which correspond to (preferred) embodiments of the method according the invention or can be derived from these and vice versa.

The invention is explained in more detail below using selected examples. Unless otherwise stated, all data refer to the weight.

DRAWINGS

FIG. 1: Suppression of weed growth by non-ureolytic biocementation using the bacterial strain B. pseudofirmus: Effect against monocotyls (annual meadow grass) and dicotyls (ribwort plantain). Average coverage rates of weed growth in the 42-day documentation period with weekly control of the control (top) versus the sample treated with biocementation mixture 1 (centre). Visual representation (bottom) of weed growth in control application (bottom left) compared to treatment with biocementation mixture 1 (bottom right) after 42 days of growth.

Figure 2:
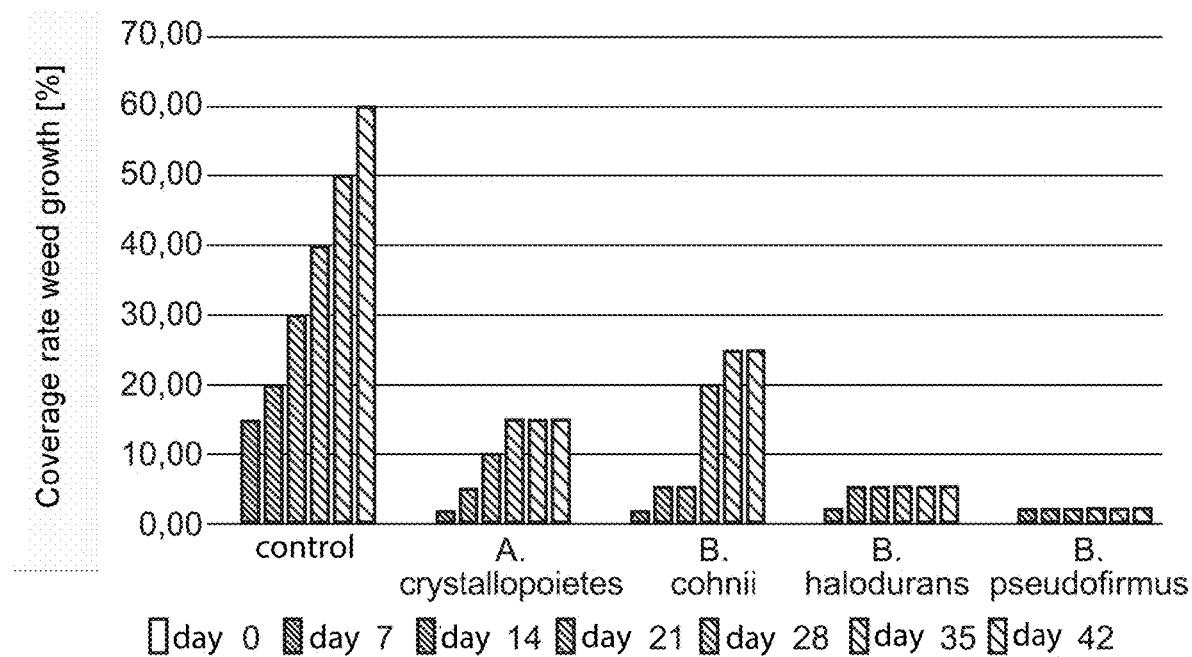

FIG. 2: Suppression of weed growth by non-ureolytic biocementation with the bacterial strains A. crystallopoietes, B. cohnii B. halodurans, and B. pseudofirmus: Effect against monocotyls (annual meadow grass) and dicotyls (ribwort plantain). Average coverage rates of weed growth over the 42-day documentation period for weekly control measurement versus samples treated with biocementation mixture 1.

Figure 3:
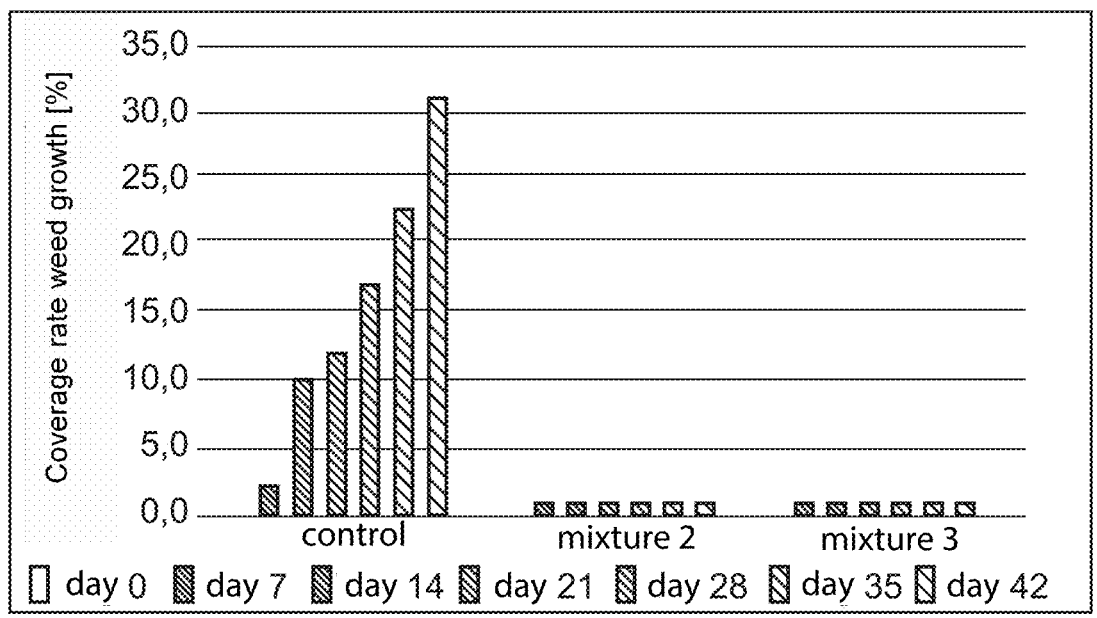
Figure 3:
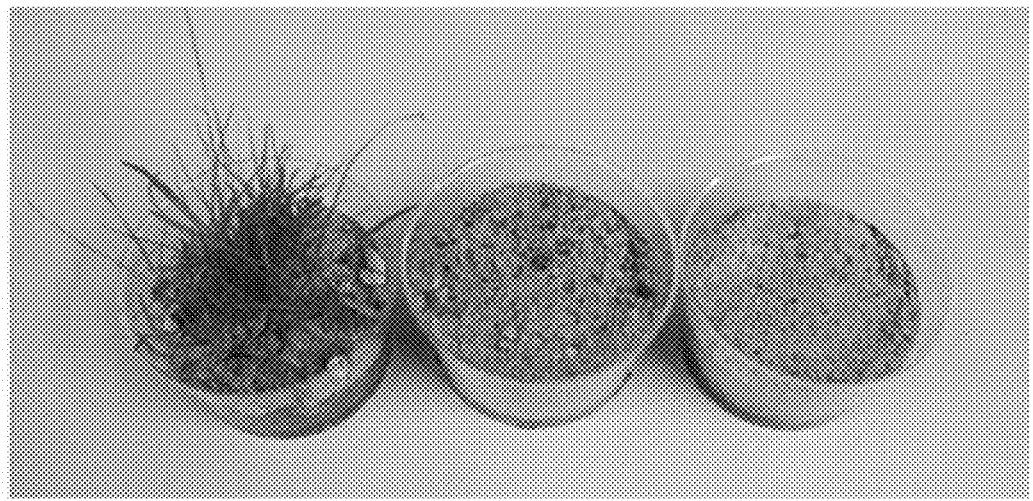
Figure 3:
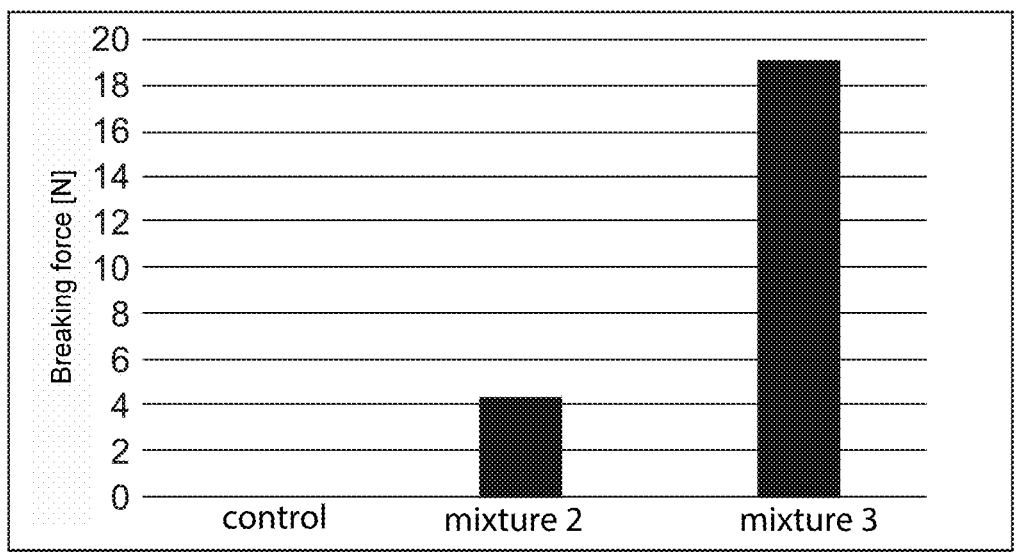

FIG. 3: Application of ureolytic biocementation with L. sphaericus to suppress weed growth in quartz sand: Effect against monocotyls (annual meadow grass) and dicotyls (ribwort plantain) weeds. Average coverage rates of weed growth (top) in the documentation period of 42 days with weekly assessment of control versus biocementation mixture 2 and biocementation mixture 3. Visual presentation (centre) of weed growth in control application (centre left) compared to treatment with biocementation mixture 2 (centre centre) and biocementation mixture 3 (centre right) after 42 days of growth in the laboratory. Graphical representation of the solidification of the biocementation layers (bottom) by investigation of the average breaking force of the specimens.

Figure 4:
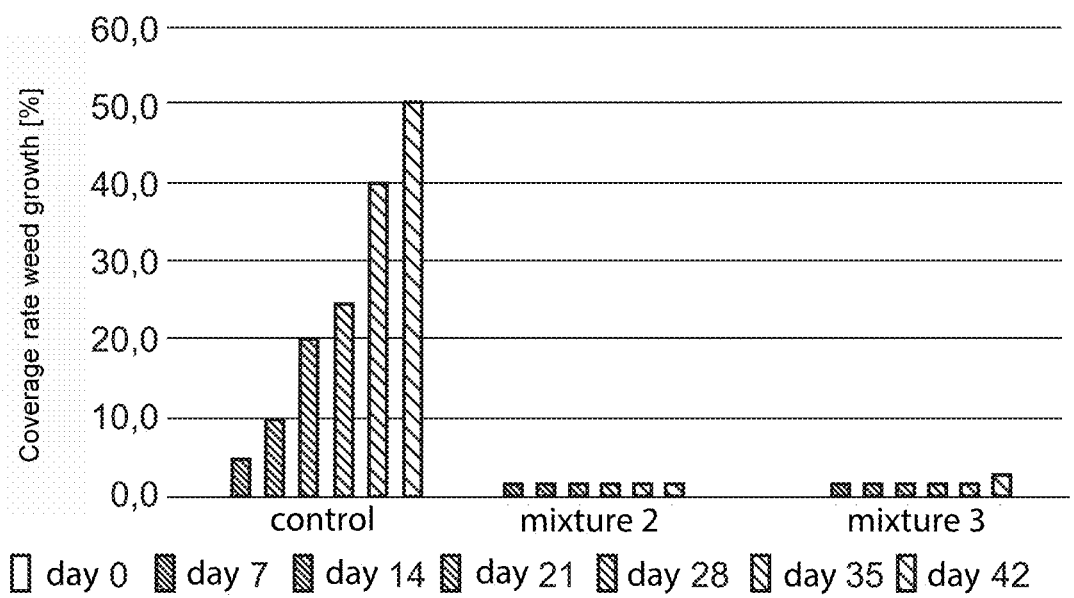
Figure 4:
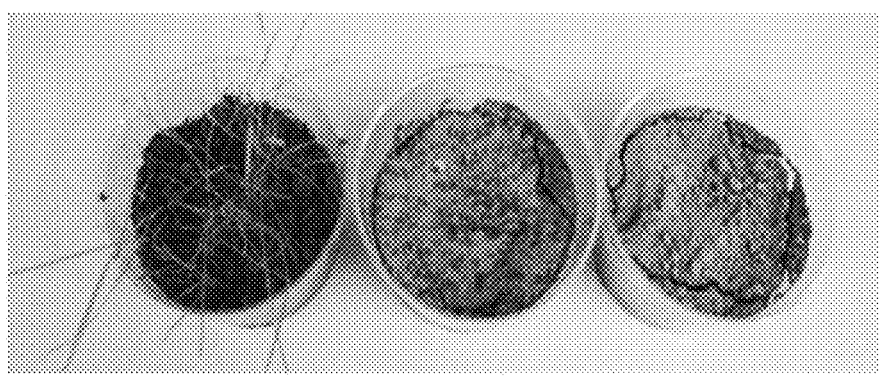
Figure 4:
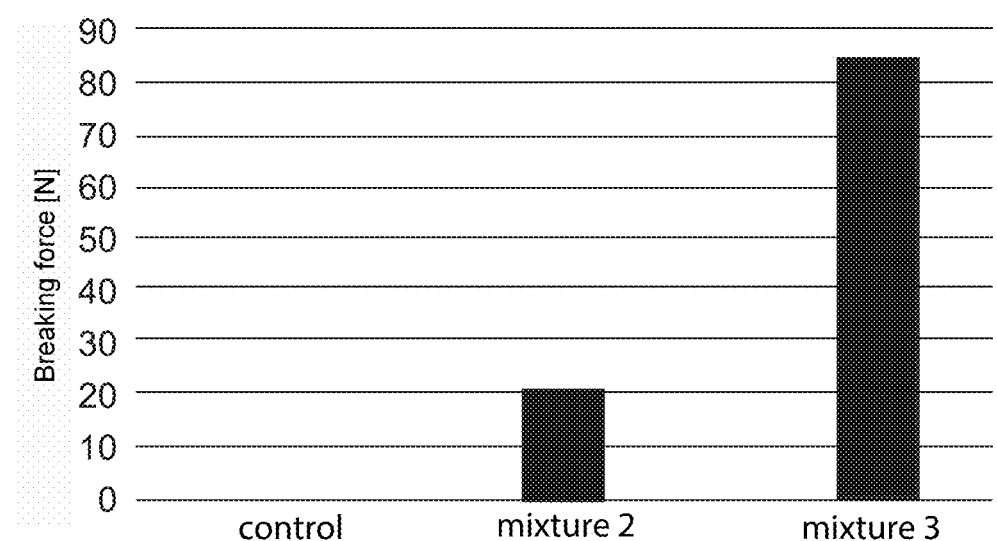

FIG. 4: Application of ureolytic biocementation with L. sphaericus to suppress weed growth in land soil: Effect against monocotyls (annual meadow grass) and dicotyls (ribwort plantain) weeds. Average coverage rates of weed growth (top) in the documentation period of 42 days with weekly assessment of control versus biocementation mixture 2 and biocementation mixture 3. Visual presentation (centre) of weed growth in control application (centre left) compared to treatment with biocementation mixture 2 (centre centre) and biocementation mixture 3 (centre right) after 42 days of growth in the laboratory. Graphical representation of the solidification of the biocementation layers (bottom) by investigation of the average breaking force of the specimens.

Figure 5:
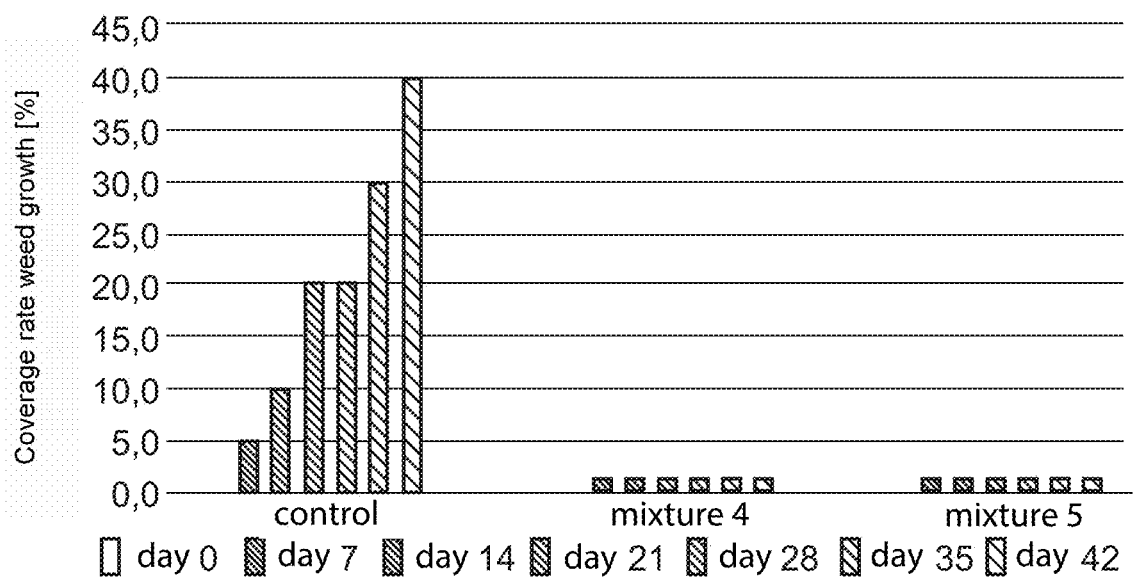
Figure 5:
Figure 5:
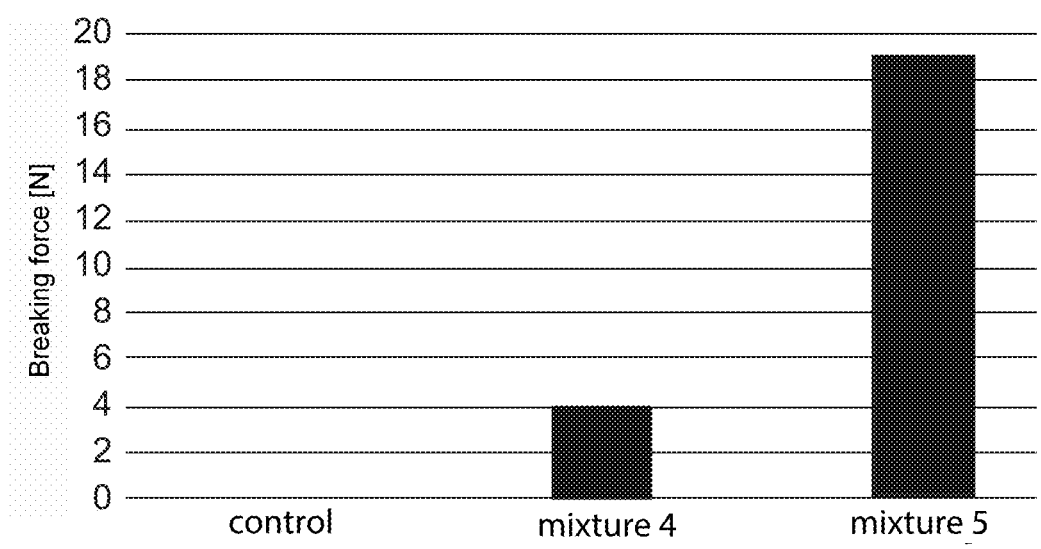

FIG. 5: Application of ureolytic biocementation with Sp. pasteurii to suppress weed growth in quartz sand: Effect against monocotyls (annual meadow grass) and dicotyls (ribwort plantain) weeds. Average coverage rates of weed growth (top) in the documentation period of 42 days with weekly assessment of control versus biocementation mixture 4 and biocementation mixture 5. Visual presentation (centre) of weed growth in control application (centre left) compared to treatment with biocementation mixture 4 (centre centre) and biocementation mixture 5 (centre right) after 42 days of growth in the laboratory. Graphical representation of the solidification of the biocementation layers (bottom) by investigation of the average breaking force of the specimens.

Figure 6:
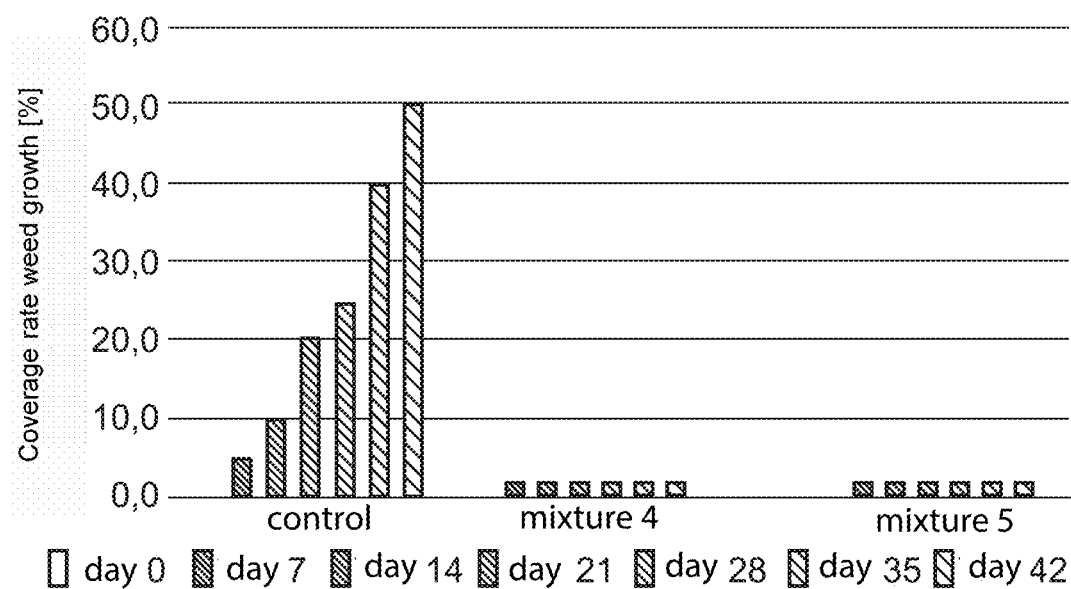
Figure 6:
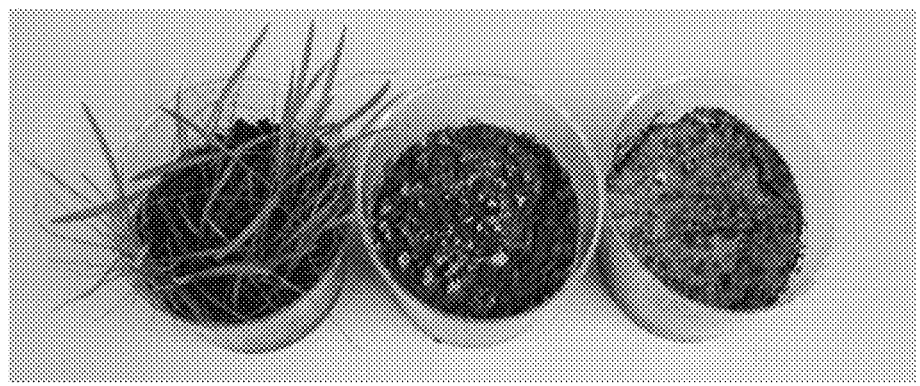
Figure 6:
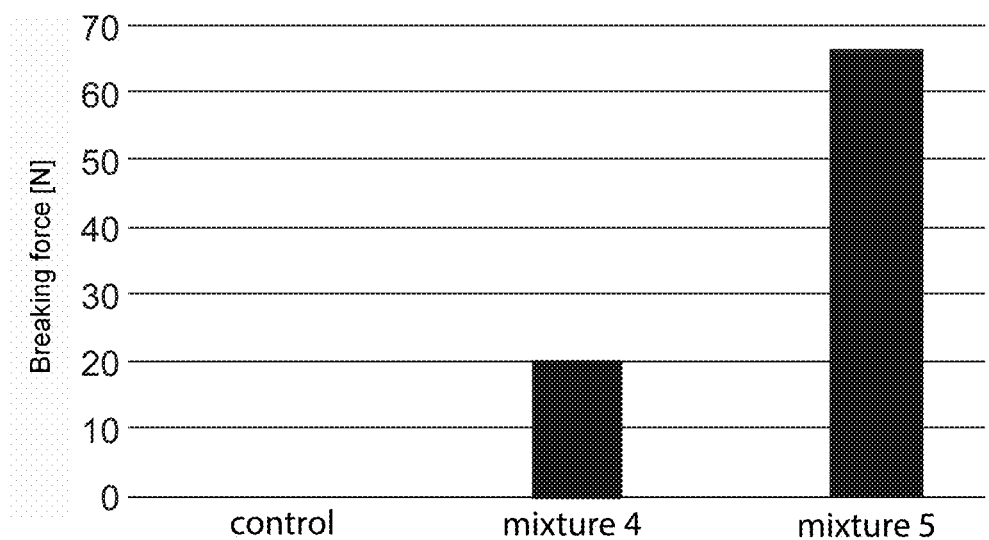

FIG. 6: Application of ureolytic biocementation with Sp. pasteurii to suppress weed growth in land soil: Effect against monocotyls (annual meadow grass) and dicotyls (ribwort plantain) weeds. Average coverage rates of weed growth (top) in the documentation period of 42 days with weekly assessment of control versus biocementation mixture 4 and biocementation mixture 5. Visual presentation (centre) of weed growth in control application (centre left) compared to treatment with biocementation mixture 4 (centre centre) and biocementation mixture 5 (centre right) after 42 days of growth in the laboratory. Graphical representation of the solidification of the biocementation layers (bottom) by investigation of the average breaking force of the specimens.

Figure 7:
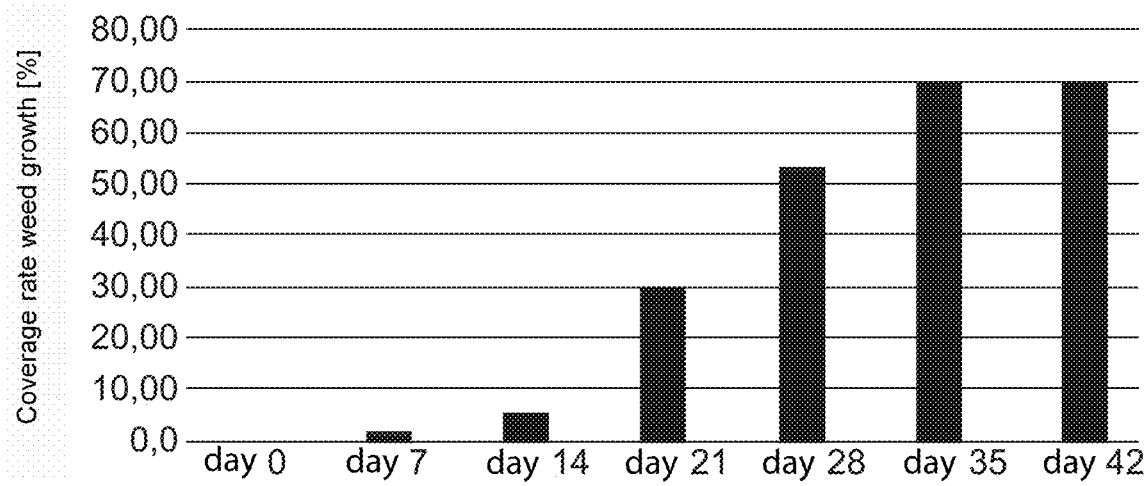
Figure 7:
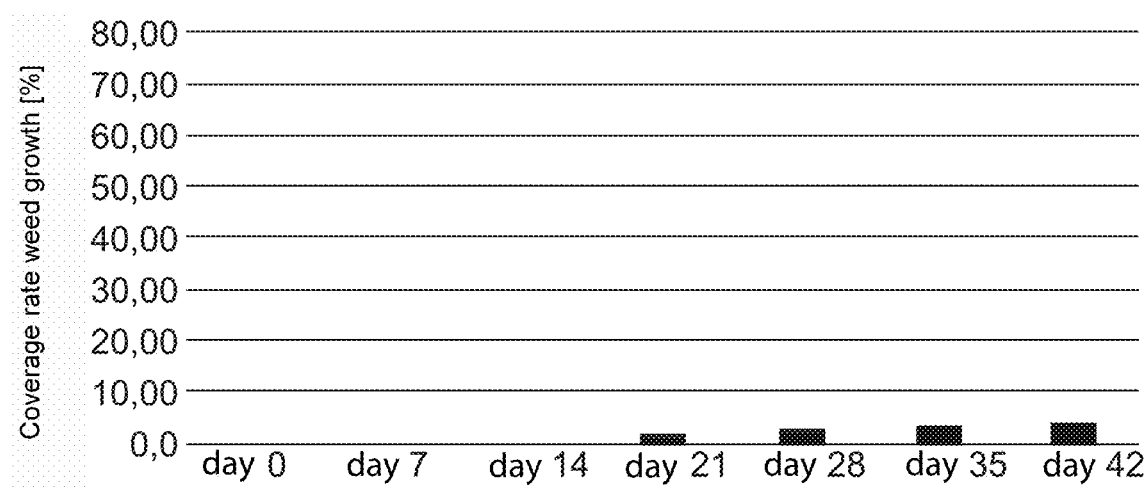
Figure 7:
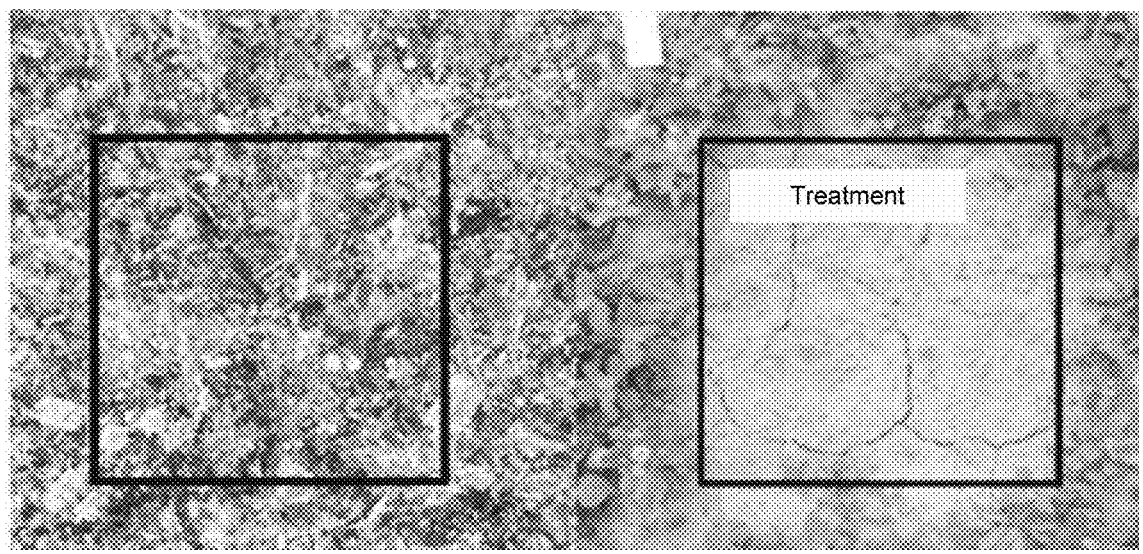

FIG. 7: Application of biocementation to suppress weed growth in open land: Effect against non-sprouted and freshly sprouted weeds on agricultural land. Average coverage rates of water control (top) compared to the area treated with biocementation mixture 6 (centre) in the documentation period of 42 days with weekly assessment. Visual representation of weed growth in control application (bottom left) compared to treatment with biocementation mixture 6 (bottom right) after 42 days of outdoor growth.

Figure 8:
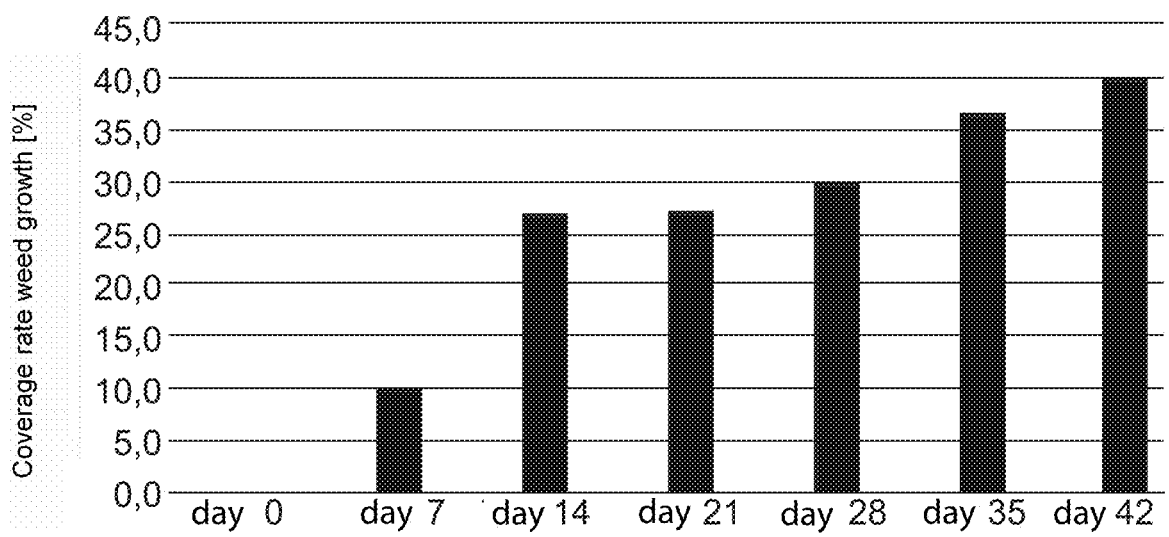
Figure 8:
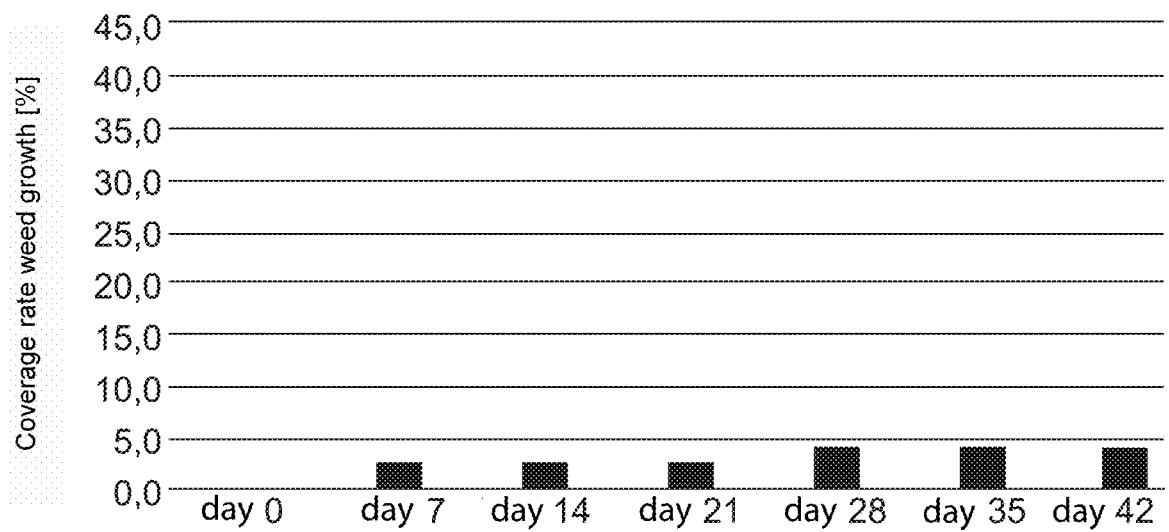
Figure 8:
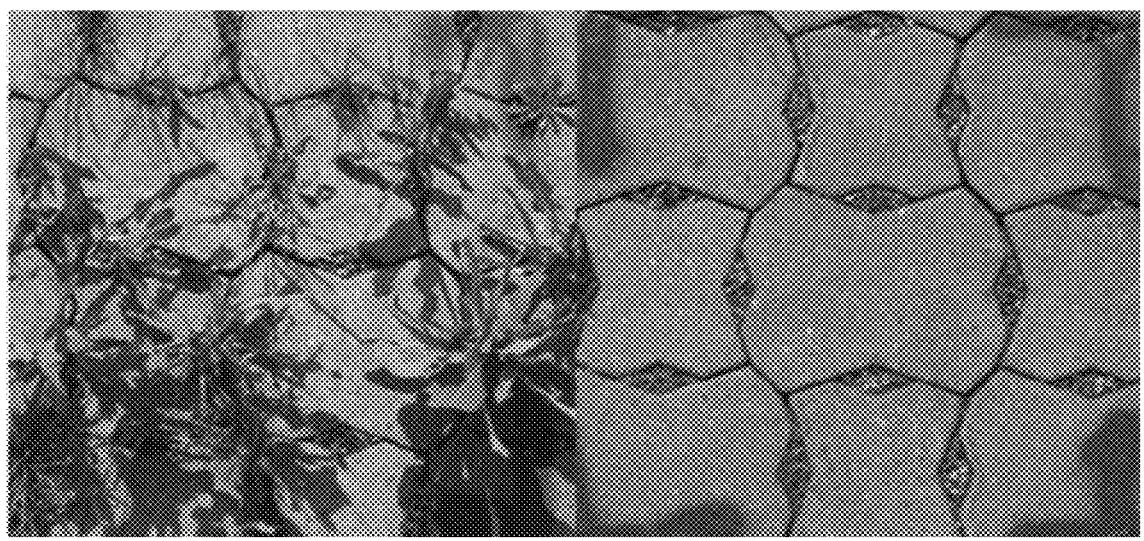

FIG. 8: Application of biocementation to suppress weed growth in open land: Effect against non-sprouted and freshly sprouted weeds in pavement joints. Average coverage rates of water control (top) compared to the area treated with biocementation mixture 6 (centre) in the documentation period of 42 days with weekly assessment. Visual representation of weed growth in control application (bottom left) compared to treatment with biocementation mixture 6 (bottom right) after 42 days of outdoor growth.

EXAMPLES

Example 1: Non-Ureolytic Biocementation with B. pseudofirmus—Suppression of Growth of Monocotyledonous and Dicotyledonous Weeds Materials and Methods:

The experiment was carried out in the laboratory in plant pots with a volume of 450 cm$^3$. The application area was 78.5 cm$^2$, respectively. A total of 6 samples were treated.

The soil substrate in the experiment consisted of quartz sand with a grain size of 0-2 mm. The sand was washed and dried by the manufacturer and was used directly. 300 g quartz sand per plant pot were used as soil substrate.

Before treatment, the quartz sand was free of weed growth and contained only residues of endemic weed seeds or inflowing seeds. However, these were not sufficient for efficient weed growth. Weed sowing was carried out with 0.2 g *Plantago lanceolate* (ribwort plantain) and 0.1 g *Poa annua* (annual meadow grass) per vessel, respectively. For this purpose, the weed seeds were worked into the top soil layer at a depth of 2-4 mm.

A liquid biocementation mixture 1 was used, which consisted of the following components in the following concentrations:

| | | |
|---|---|---|
| 20.0 | g/l | Yeast extract |
| 0.2 | M | calcium acetate |
| 0.2 | M | calcium lactate |
| 6.0 | g/l | urea |
| 5 × 10$^8$ | cells/ml | B. pseudofirmus |

The mixture also contains trace elements and traces of salts and sugars, for example (<1 wt. %). In this medium, urea served primarily as a source of nitrogen (and not as a carbonate source).

All components of the present mixture, which is capable of biocementation, except for the bacteria of strain B. pseudofirmus, were present in solid form. The bacteria were present as liquid culture in a culture medium known in state of the art, as described for example in Jonkers H. M. et al., Tailor Made Concrete Structures—Walraven & Stoelhorst (eds), 2008, Taylor & Francis Group, London, ISBN 978-0-415-47535-8, section 2.1, using 5 g/L yeast extract in the context of the present invention. The solid components and the bacteria in liquid culture were mixed directly before use, dissolving the solid components.

The biocementation mixture 1 and a water control were applied in three replicas to each of the test plots. The application quantity per square metre was 5 litres per replica throughout. A pipette was used for application.

After the application of biocementation mixture 1, incubation for 48 hours without irrigation took place. During this period, the minimum temperature was 14.2° C. and the maximum temperature was 25.2° C.

Weed growth was documented over 42 days after application. The minimum and maximum temperatures during this period were 10.7° C. and 34.0° C. The vessels were watered once to three times a week, depending on requirements. The plant pots were exposed to natural lighting with day and night rhythm.

Weed growth was documented on a weekly basis. Both the biocementation layer (layer thickness, strength) and the so-called coverage rate were determined. The weed growth coverage rates were determined by manual visual assessment of the plant pots at the specified times. The coverage rate describes in percent the area covered by weeds. From this in turn the degree of efficiency according to Abbott was calculated as follows:

Degree of efficiency=(coverage rate control$_{day\ xy}$–coverage rate product$_{day\ xy}$)/coverage rate control$_{day\ xy}$ To verify the carbonate formation, 10 ml of the biocementation mixture 1 were incubated openly in a reaction vessel for 24 h at room temperature. Subsequently, the precipitated pellet was obtained by centrifugation and drying. The dried pellet was used for carbonate detection according to Scheibler.

Results:

Weed growth was almost completely reduced compared to control (FIG. 1). The average coverage rate after 42 days was 2% in the treated area (FIG. 1, centre) and 60% in the control area (FIG. 1, top). A biocementation layer was formed during treatment with the biocementation mixture 1 specified above. Weed growth occurred mainly in areas where the biocementation layer was damaged (e.g. in drying cracks). The courses of time over the 42 days can be taken from FIG. 1 (top and centre). In the course of time, an effect of biocementation in weed suppression is visible. FIG. 1 illustrates the direct comparison between a control sample (bottom left) and an application sample (bottom right) after 42 days of growth. The final degree of efficiency of the biocementation product was 96.7%.

The biocementation mixture is advantageously similarly effective as many commercially available weed suppressants (data not shown), whereby various disadvantages of such weed suppressants can be avoided.

The qualitative analysis of the carbonate formation according to Scheibler showed a positive reaction for the biocementation mixture. The control on the other hand did not show any carbonate formation (data not shown).

Comparable effects on weed growth were also achieved with slightly modified formulations of the biocementation mixture 1 containing calcium acetate, calcium lactate and/or calcium chloride in a concentration of 0.05 to 0.3 M, respectively, and not exceeding a total calcium concentration of 0.4 M in the mixture (data not shown). A variation in the urea concentration (0.0 to 0.2 M) or in the yeast extract quantity (0.1 to 30 g/l) also yielded good degrees of efficiency. Weed suppression was dependent on the used concentrations of the components of the biocementation mixture, respectively (data not shown).

The entire experiment described above was performed alternatively with weed seeds that had germinated 24 hours prior to the application of the biocementation mixture. For this purpose, the biocementation mixture was applied 1 24 hours after the start of germination. The results obtained were comparable to those described in the present example and an almost complete reduction in weed growth was achieved by applying the mixture (data not shown).

Furthermore, in the biocementation mixture 1 described above, the bacterial strain B. pseudofirmus was replaced by the same cell number concentration of B. cohnii, B. halodurans or A. crystallopoietes, respectively, the experiment being carried out as described above, respectively. B. cohnii and B. halodurans were present in the same culture medium as B. pseudofirmus (see above) and A. crystallopoietes was present in a known culture medium such as Hamilton, R. W. et al., Journal of Bacteriology 1977, 129(2), 874-879 (see section "Materials and Methods", p. 874-875). The test results of weed suppression with these alternative biocementation mixtures are shown in FIG. 2.

Example 2: Ureolytic Biocementation with L. sphaericus—Suppression of Growth of Monocotyledonous and Dicotyledonous Weeds Materials and Methods:

In the present experiment, two biocementation mixtures, each with the same bacterial strain, were tested on two different soil substrates.

The experiment was carried out in the laboratory in plant pots with a volume of 450 cm$^3$. The application area per vessel was 78.5 cm$^2$, respectively. A total of 9 plant pots per soil substrate were treated with the two different biocementation mixtures (see below).

The first soil substrate in the experiment consisted of quartz sand with a grain size of 0-2 mm. The quartz sand was washed and dried by the manufacturer and was used directly. 300 g quartz sand per plant pot were used as soil substrate. In a further row, sifted land soil was used as the second soil substrate. Here, 250 g of land soil were used per application vessel.

Both soil substrates were free of weed growth prior to treatment. However, both soils contained minimal residues of endemic weed seeds or inflowing seeds. However, these were not sufficient for efficient weed growth. Weed sowing was carried out with 0.2 g Plantago lanceolate (ribwort plantain) and 0.1 g *Poa annua* (annual meadow grass) per vessel, respectively. For this purpose, the weeds were worked into the top soil layer at a depth of 2-4 mm.

Two different liquid biocementation mixtures were used in the experiment.

Mixture 2 was composed of the following components in the following concentrations:

| 20.0 | g/l | Yeast extract |
|---|---|---|
| 0.25 | M | calcium chloride |
| 18.0 | g/l | urea |
| $4 \times 10^8$ | cells/ml | *L. sphaericus* |

The mixture also contained trace elements and traces of salts and sugars, for example (<1%). In this medium, urea served primarily as a source of carbonate and secondarily as a source of nitrogen.

In mixture 3, 50 ml/l Silicade 8 (silica sol-acrylic dispersion) was additionally added as additive. The additive was used to achieve a longer lasting stability of the biocementation layer.

The components of the biocementation mixtures 2 and 3 (without bacteria) were present in solid form, respectively. The bacteria were present as liquid culture in a culture medium known in state of the art, respectively, as described for example in in Dick, J. et al., Biodegradation 2006, 17, 357-367 (see section "Materials and Methods", p. 359). The solid components and the bacteria in liquid culture were mixed directly before use, respectively, dissolving the solid components. Silicade 8 was present in liquid form and was only added to mixture 3.

The biocementation mixtures 2 and 3 as well as a water control were applied in three replicas next to each other to the two test soils. The application quantity per square metre was 5 litres per replica throughout. A pipette was used for application.

After the application of the biocementation mixtures, incubation for 48 hours without irrigation took place. During this period, the minimum temperature was 12.4° C. and the maximum temperature was 24.2° C.

Weed growth was documented over 42 days after application. The minimum and maximum temperatures during this period were 9.7° C. and 27.9° C. The vessels were watered once to three times a week, depending on requirements. The plant pots were exposed to natural lighting with day and night rhythm.

Weed growth was documented on a weekly basis. Both the biocementation layer (layer thickness, strength) and the so-called coverage rate were determined. The weed growth coverage rates were determined by manual visual assessment of the plant pots at the specified times. The coverage rate describes in percent the area covered by weeds. From this in turn the degree of efficiency according to Abbott was calculated as follows:

Degree of efficiency=(coverage rate control$_{day\ xy}$–coverage rate product$_{day\ xy}$)/coverage rate control$_{day\ xy}$ To verify the carbonate formation, 10 ml of the biocementation mixtures 2 and 3, respectively, were incubated openly in a reaction vessel for 24 h at room temperature.

Subsequently, the precipitated pellet was obtained by centrifugation and drying, respectively. The dried pellets were used for carbonate detection according to Scheibler.

Results:

On the quartz sand, weed growth was completely reduced compared to the control with both biocementation mixtures 2 and 3 (FIG. 3). The average coverage rate after 42 days was 0% on the area treated with biocementation mixture 2, 0% on the area treated with biocementation mixture 3 and 31% on the control area. In both treatments (with biocementation mixture 2 and 3) a biocementation layer was formed. Weed growth occurred mainly in areas where the biocementation layer was damaged (e.g. in drying cracks). The courses of time over the 42 days can be taken from FIG. 3 (top). The effect of biocementation on weed suppression is illustrated in FIG. 3 (centre) and demonstrates the direct comparison between a control (centre left), biocementation mixture 2 (centre centre) and biocementation mixture 3 (centre right). The final degree of efficiency of both biocementation mixtures was 100%, respectively. After 42 days, the strengths of the biocementation layers were determined (as described above). The biocementation sample with mixture 2 had a layer with an average breaking force of 4.3 N, however, it is lower than with mixture 3 with 19.1 N (see FIG. 3 (below)). By incorporating the Silicade 8 additive in the biocementation layer (through biocementation mixture 3), an increased resistance to environmental parameters and thus probably longer effectiveness could be achieved. No biocement layer was present in the control sample.

On the land soil, weed growth was almost completely reduced compared to control (FIG. 4). The average coverage rate after 42 days was 0% on the area treated with biocementation mixture 2, 2% on the area treated with biocementation mixture 3 and 50% on the control area. In both treatments (with biocementation mixture 2 and 3) a biocementation layer was formed. Weed growth occurred mainly in areas where the biocementation layer was damaged (e.g. in drying cracks). The courses of time over the 42 days can be taken from FIG. 4 (top). The effect of the biocementation on weed suppression is illustrated in FIG. 4 (centre) and demonstrates the direct comparison between a control sample (centre left), biocementation mixture 2 (centre centre) and biocementation mixture 3 (centre right). The final degree of efficiency of the two biocementation mixtures 2 and 3 was 100% and 96%, respectively. After 42 days, the strength of the resulting biocementation layers was determined (as described above). The biocementation sample with mixture 2 had a layer with an average breaking force of 20.5 N, however, it is lower than with mixture 3 with 84.3 N. By incorporating the Silicade 8 additive in the biocementation layer (through biocementation mixture 3), an increased resistance to environmental parameters and thus probably longer effectiveness could be achieved. No biocement layer was present in the control sample.

The qualitative analysis of the carbonate formation according to Scheibler showed a positive reaction for the biocementation mixtures 2 and 3. The controls showed no carbonate formation (data not shown).

Comparable effects on weed growth were also shown in slightly modified formulations of biocementation mixtures 2 and 3 containing calcium acetate, calcium lactate and/or calcium chloride in a concentration of 0.05 to 0.3 M, respectively, and not exceeding a total calcium concentration of 0.4 M (data not shown). A stronger variation in the urea concentration (e.g. 0.1 to 1.0 M) or in the yeast extract quantity (e.g. 0.1 to 30 g/l) also produced good degrees of efficiency. Weed suppression was dependent on the concentrations of the components used in the respective biocementation mixture, respectively (data not shown).

The entire experiments described above were performed alternatively with weed seeds that had germinated 24 hours prior to the application of the respective biocementation mixture. For this purpose, the respective biocementation mixture was applied 24 hours after the start of germination. The results obtained were comparable to those described in the present example and an almost complete reduction in weed growth was achieved by applying the respective mixture (data not shown).

Example 3: Ureolytic Biocementation with *Sp. Pasteurii*—Growth Suppression of Monocotyledonous and Dicotyledonous Weeds Materials and Methods:

In the present experiment, two biocementation mixtures, each with the same bacterial strain, were tested on two different soil substrates.

The experiment was carried out in the laboratory in plant pots with a volume of 450 cm³. The application area was 78.5 cm², respectively. A total of 9 plant pots per soil substrate were treated with the two different biocementation mixtures (see below). The application area per vessel was 78.5 cm², respectively.

The first soil substrate in the experiment consisted of quartz sand with a grain size of 0-2 mm. The quartz sand was washed and dried by the manufacturer and was used directly. 300 g quartz sand per plant pot were used as soil substrate. In a further row, sifted land soil was used as the second soil substrate. Here, 250 g of land soil were used per application vessel.

Both soil substrates were free of weeds prior to treatment. Both soils contained minimal residues of endemic weed seeds or inflowing seeds. However, these were not sufficient for efficient weed growth. Weed sowing was carried out with 0.2 g *Plantago* lanceolata (ribwort plantain) and 0.1 g *Poa annua* (annual meadow grass) per vessel, respectively. For this purpose, the weed seeds were worked into the top soil layer at a depth of 2-4 mm.

Two different liquid biocementation mixtures were used in the experiment.

Mixture 4 was composed of the following components in the following concentrations:

| | | |
|---|---|---|
| 20.0 | g/l | Yeast extract |
| 0.25 | M | calcium chloride |
| 18.0 | g/l | urea |
| 4 × 10⁸ | cells/ml | *Sp. pasteurii* |

The mixture also contained trace elements and traces of salts and sugars, for example (<1%). In this medium, urea served primarily as a source of carbonate and secondarily as a source of nitrogen.

In mixture 5, 50 ml/l Silicade 8 (silica sol-acrylic dispersion) was additionally added as additive. The additive was used to achieve a longer lasting stability of the biocementation layer.

The components of the biocementation mixtures 4 and 5 (without bacteria) were present in solid form, respectively. The bacteria were present as liquid culture in a culture medium known from the state of the art, respectively, as described for example in Cuthbert, M. O. et al., Ecological Engineering 2012, 41, 32-40 (see section 2.2, p. 33). The solid components and the bacteria in liquid culture were mixed directly before use, respectively, dissolving the solid components. Silicade 8 was present in liquid form and was only added to mixture 5.

The biocementation mixtures 4 and 5 as well as a water control were applied in three replicas next to each other to the two test soils. The application quantity per square metre was 5 litres per replica throughout. A pipette was used for application.

After the application of the biocementation mixtures, incubation for 48 hours without irrigation took place. During this period, the minimum temperature was 12.4° C. and the maximum temperature was 24.2° C.

Weed growth was documented over 42 days after application. The minimum and maximum temperatures during this period were 9.7° C. and 27.9° C. The vessels were watered once to three times a week, depending on requirements. The plant pots were exposed to natural lighting with day and night rhythm.

Weed growth was documented on a weekly basis. Both the biocementation layer (layer thickness, strength) and the so-called coverage rate were determined. The weed growth coverage rates were determined by manual visual assessment of the plant pots at the specified times. The coverage rate describes in percent the area covered by weeds. From this in turn the degree of efficiency according to Abbott was calculated as follows:

$$\text{Degree of efficiency} = (\text{coverage rate control}_{day\ xy} - \text{coverage rate product}_{day\ xy})/\text{coverage rate control}_{day\ xy}$$

To verify the carbonate formation, 10 ml of the biocementation mixtures 4 and 5, respectively, were incubated openly in a reaction vessel for 24 h at room temperature. Subsequently, the precipitated pellet was obtained by centrifugation and drying, respectively. The dried pellets were used for carbonate detection according to Scheibler.

Results:

On the quartz sand, weed growth was completely reduced compared to the control (FIG. 5). The average coverage rate after 42 days was 0% on the area treated with biocementation mixture 4, 0% on the area treated with biocementation mixture 5 and 40% on the control area. In treatments with the mixtures a biocementation layer was formed. Weed growth occurred mainly in areas where the biocementation layer was damaged (e.g. in drying cracks). The courses of time over the 42 days can be taken from FIG. 5 (top). The effect of biocementation on weed suppression is illustrated in FIG. 5 (centre) and demonstrates the direct comparison between a control (centre left), biocementation mixture 4 (centre centre) and biocementation mixture 5 (centre right). The final degree of efficiency of both biocementation mixtures was approximately 100%, respectively. After 42 days, the strengths of the biocementation layers were determined (as described above). The biocementation sample with mixture 4 had a layer with an average breaking force of 4.1 N, the sample with mixture 5 had an average breaking force of 19.3 N (see FIG. 5 (below)). By incorporating the Silicade 8 additive in the biocementation layer (through biocementation mixture 5), an increased resistance to environmental parameters and thus probably longer effectiveness could be achieved. No biocement layer was present in the control.

On the land soil, weed growth was almost completely reduced compared to control (FIG. 6). The average coverage rate after 42 days was 0% on the area treated with biocementation mixture 4, 0% on the area treated with biocementation mixture 5 and 50% on the control area. In treatments with the mixtures a biocementation layer was formed. Weed growth occurred mainly in areas where the biocementation layer was damaged (e.g. in drying cracks). The courses of time over the 42 days can be taken from FIG. 6 (top). The effect of the biocementation on weed suppression is illustrated in FIG. 6 (centre) and demonstrates the direct comparison between a control sample (centre left), mixture 4 (centre centre) and mixture 5 (centre right). The final degree of efficiency of the two biocementation mixtures was 100%, respectively. After 42 days, the strength of the resulting biocementation layers was determined. The biocementation sample with mixture 4 had a layer with an average breaking force of 20.8 N, the sample with mixture 5 had an average breaking force of 66.8 N. By incorporating the Silicade 8 additive in the biocementation layer (through biocementation mixture 5), an increased resistance to environmental parameters and thus probably longer effectiveness could be achieved. No biocement layer was present in the control.

The qualitative analysis of the carbonate formation according to Scheibler showed a positive reaction for the biocementation mixtures 4 and 5, respectively. The controls showed no carbonate formation (data not shown).

Comparable effects on weed growth were also shown in slightly modified formulations of biocementation mixtures 4 and 5 containing calcium acetate, calcium lactate and/or calcium chloride in a concentration of 0.05 to 0.3 M, respectively, and not exceeding a total calcium concentration of 0.4 M (data not shown). A stronger variation in the urea concentration (e.g. 0.1 to 1.0 M) also produced good degrees of efficiency. Weed suppression was dependent on the concentrations of the components used in the respective biocementation mixture, respectively (data not shown).

The entire experiments described above were performed alternatively with weed seeds that had germinated 24 hours prior to the application of the respective biocementation mixture. For this purpose, the respective biocementation mixture was applied 24 hours after the start of germination. The results obtained were comparable to those described in the present example and an almost complete reduction in weed growth was achieved by applying the respective mixture (data not shown).

Example 4: Open Land—Suppression of Weeds on Agricultural Land and Pavement Joints Materials and Methods:

The experiment was carried out on agricultural land and a grouted driveway. The application area was 6 m², respectively.

The soil substrate of the agricultural land consisted of natural land soil. Before the application of the mixture according to the invention (see below), the agricultural land was cleared of established weeds by chemical treatment with glyphosate (approx. 6 months before the present experiment). After this pre-treatment, no plant residues were left on the surface.

The joint material of the driveway consisted mainly of joint gravel and joint sand. Prior to application, these areas were mechanically cleared of established weeds by a brush cutter. After this pre-treatment there were also no plant residues left on the surface.

Both soils contained the weed seeds, inflow seeds and possibly fresh seedlings or plant remains found there. No artificial weed sowing was carried out as there were enough endemic weeds present at both sites.

For the experiment a liquid biocementation mixture 6 was used consisting of the following components and concentrations:

| | | |
|---|---|---|
| 18.0 | g/l | Urea |
| 62.5 | g/l | lignosulfonate |
| $5 \times 10^{\wedge}8$ | cells/ml | *Sporosarcina pasteurii* |

The solution also contains trace elements and traces of salts, sugars and yeast extract, for example (<1%).

The bacteria were present as liquid culture in culture medium (see description in previous example 3). The urea and the lignosulfonate were originally present in solid form. They were dissolved in water directly before use and mixed with the liquid culture of the bacteria.

The biocementation mixture 6 and a water control were applied in three replicas to each of the two test areas, respectively. The application quantity per square metre was 4 litres per replica throughout. A standard watering can (5 l volume) was used for application.

After the application of the biocementation mixture 6, incubation was carried out for 48 hours without rain or artificial irrigation. During this period, the minimum temperature was 5° C. and the maximum temperature was 25° C.

Weed growth was documented over 42 days after application. The minimum and maximum temperatures were 5° C. and 33° C., respectively. The total precipitation during the documentation period was 91 mm (l/m²). Due to the weather no additional watering was necessary.

Weed growth was documented on a weekly basis. Both the biocementation layer (layer thickness, strength) and the so-called coverage rate were determined. The weed growth coverage rates were determined by manual visual assessment of the plant pots at the specified times. The coverage rate describes in percent the area covered by weeds. From this in turn the degree of efficiency according to Abbott was calculated as follows:

$$\text{Degree of efficiency} = (\text{coverage rate control}_{day\ xy} - \text{coverage rate product}_{day\ xy})/\text{coverage rate control}_{day\ xy}$$

Results:

On the agricultural land, weed growth was significantly reduced compared to control. The coverage rate after 42 days was 3.3% on the treated areas and 70.0% on the control area.

A biocementation layer was formed. Weed growth occurred mainly in areas where the biocementation layer was damaged (e.g. in drying cracks). The courses of time over the 42 days can be taken from FIG. 7 (top, water control) and FIG. 7 (centre, treatment with biocementation mixture 6). FIG. 7 (bottom) illustrates the direct comparison between the control and the application (within the marker, respectively). The final degree of efficiency of the biocementation mixture 6 was 95.2%.

On the grouted driveway, the weed growth was also significantly reduced in comparison to the control. The coverage rate after 42 days was 3.7% on the treated areas and 40.0% on the control area. Here, too, a biocementation layer was formed. The courses of time over the 42 days can be taken from FIG. 8 (top, water control) and FIG. 8 (centre, treatment with biocementation mixture 6). FIG. 8 (bottom) illustrates the direct comparison between the control and the application (within the joints). The final degree of efficiency of the biocementation product was 90.8%.

The biocementation mixture is advantageously similarly effective as many commercially available weed suppressants (data not shown), whereby various disadvantages of such weed suppressants can be avoided.

Comparable effects on weed growth in open land were also shown with alternative mixture formulations additionally containing 0.1 M to 0.3 M $CaCl_2$ (based on mixture 6) (data not shown). A stronger variation in urea concentration (1.0 to 0.15 M) also produced good degrees of efficiency in weed suppression (data not shown).

The invention claimed is:

1. A method for preventing or reducing plant growth comprising:
   (a) identifying a substrate in need of reduced plant growth,
      wherein the substrate is an area of land selected from a garden area, a joint area of terraces or entrances and exits, an arable area, an orchard, a vineyard area, a tree nursery area, a park, a part of a developed land or urban area, a road, a street, a footpath, a railway line, an industrially used area, and agricultural land;
   (b) providing a mixture capable of biocementation,
      wherein the mixture is free of cement and comprises:
         (i) one or more organisms and/or enzymes capable of forming carbonate and/or of inducing and/or catalyzing carbonate formation;
         (ii) one or more substances for the formation of carbonate;
         (iii) optionally, one or more cation sources; and
         (iv) one or more additives selected from (bio-)polymers, monomers of (bio-)polymers, hydrogel formers, cold soluble and/or warm soluble (plant) glues, polysaccharides and extracellular polymeric substances, monomers of polysaccharides, protein sources, nutrients, silicates and derivatives thereof, water glass-like binders, cement additives, hydrophobicizers, emulsifiers, binders, and bacteria capable of forming polymers; and
   (c) applying and/or introducing the mixture onto/into the substrate in an amount sufficient to enable biocementation,
      wherein the substrate is not removed from the place where it is identified in (a) prior to applying and/or introducing the mixture onto/into the substrate; and
   (d) forming a biocement layer so that plant growth on/in the substrate is prevented or reduced.

2. A method for preventing or reducing plant growth comprising:
   (a) identifying a substrate in need of reduced plant growth, wherein the substrate is selected from sand, soil, humus, crushed stone, gravel, clay, silt, sawdust, paper, cardboard, chipboard, softwood, limestone, coal, and mixtures thereof;
   (b) providing a mixture capable of biocementation,
      wherein the mixture is free of cement and comprises:
         (i) one or more organisms and/or enzymes capable of forming carbonate and/or of inducing and/or catalyzing carbonate formation;
         (ii) one or more substances for the formation of carbonate;
         (iii) optionally, one or more cation sources; and
         (iv) one or more additives selected from (bio-)polymers, monomers of (bio-)polymers, hydrogel formers, cold soluble and/or warm soluble (plant) glues, polysaccharides and extracellular polymeric substances, monomers of polysaccharides, protein sources, nutrients, silicates and derivatives thereof, water glass-like binders, cement additives, hydrophobicizers, emulsifiers, binders, and bacteria capable of forming polymers; and
   (c) applying and/or introducing the mixture onto/into the substrate in an amount sufficient to enable biocementation,
      wherein the substrate is not removed from the place where it is identified in (a) prior to applying and/or introducing the mixture onto/into the substrate; and
   (d) forming a biocement layer so that plant growth on/in the substrate is prevented or reduced.

3. The method according to claim 1, wherein the plant is selected from the group consisting of dicotyls of the genera: *Abutilon, Aegopodium, Aethusa, Amaranthus, Ambrosia, Anachusa, Anagallis, Anoda, Anthemis, Aphanes, Arabidopsis, Atriplex, Barbarea, Bellis, Bidens, Bunias, Capsella, Carduus, Cassia, Centaurea, Chenopodium, Chrysanthemum, Cirsium, Conium, Conyza, Consolida, Convolvulus, Datura, Descurainia, Desmodium, Emex, Equisetum, Erigeron, Erodium, Erysimum, Euphorbia, Fumaria, Galeopsis, Galinsoga, Galium, Geranium, Heracleum, Hibiscus, Ipomoea, Kochia, Lamium, Lapsana, Lathyrus, Lepidium, Lithoserpermum, Linaria, Lindernia, Lycopsis, Malva, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Sisymbrium, Solanum, Sonchus, Sphenoclea, Stachys, Stellaria, Taraxacum, Thlaspi, Trifolium, Tussaligo, Urtica, Veronica, Viola, Xanthium*; dicotyls of the genera: *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia*; monocotyls of the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Juncus, Leptochloa, Lolium, Monochoria, Panicum, Paspalum, Phalaris, Phleum, Poa, Rottboellia, Sagittaria, Scirpus, Setaria, Sorghum*; and monocotyls of the genera: *Allium, Ananas, Asparagus, Avena, Hordeum, Oryza, Panicum, Saccharum, Secale, Sorghum, Triticale, Triticum, Zea*; mosses of the lineages liverworts, hornworts, mosses, and mixtures thereof.

4. The method according to claim 1, wherein the mixture is present in liquid form, as a gel, paste or powder.

5. The method according to claim 1, wherein the mixture comprises one or more enzymes.

6. The method according to claim 1, wherein the mixture comprises one or more microorganisms.

7. The method according to claim 6, wherein the microorganisms are selected from microorganisms of the phylum of Firmicutes, Proteobacteria, Actinobacteria, Cyanobacteria, and a mixture thereof.

8. The method according to claim 7, wherein the microorganisms are selected from the class of Bacilli, Alphaproteobacteria, Gammaproteobacteria, Deltaproteobacteria, Epsilonproteobacteria, Actinobacteria, Cyanobacteria, and a mixture thereof.

9. The method according to claim 8, wherein the microorganisms are selected from the order of Bacillales, Enterobacteriales, Actinomycetales, Synechococcales, and a mixture thereof.

10. The method according to claim 9, wherein the microorganisms are selected from the families of Planococcaceae, Bacillaceae, Enterobacteriaceae, Myxococcaceae, Helicobacteraceae, Pseudomonadaceae, Caulobacteraceae, Brevibacteriaceae, Micrococcineae, Synechococcaceae, and a mixture thereof.

11. The method according to claim 10, wherein the microorganisms are selected from the genera of *Sporosarcina, Lysinibacillus, Bacillus, Proteus, Myxococcus, Helicobacter, Pseudomonas, Brevundimonas, Brevibacterium*, Micrococcaceae, *Synechococcus*, and a mixture thereof.

12. The method according to claim 11, wherein the microorganisms are selected from the species of *Sporosarcina pasteurii, Sporosarcina ureae, Lysinibacillus sphaericus, Lysinibacillus fusiformis, Bacillus megaterium, Lysinibacillus* sp., *Bacillus pseudofirmus, Bacillus halodurans, Bacillus cohnii, Proteus vulgaris, Proteus mirabilis, Myxococcus xanthus, Helicobacter pylori, Pseudomonas aeruginosa, Brevundimonas diminuta, Brevibacterium linens, Arthrobacter crystallopoietes, Synechococcus*, and a mixture thereof.

13. The method according to claim 5, wherein the mixture comprises one or more enzymes selected from urease, asparaginase, carbonic anhydrase, metabolic enzymes, and a mixture thereof.

14. The method according to claim 1, wherein the one or more substances for the formation of carbonate are selected from urea and salts thereof, organic acids, peptides, amino acids, vegetable and animal complex substrates, industrial waste streams, protein lysates, anaerobic substrates, and a mixture thereof.

15. The method according to claim 1, wherein the mixture comprises one or more cation sources selected from calcium salts, magnesium salts, manganese salts, zinc salts, cobalt salts, nickel salts, copper salts, lead salts, iron salts, cadmium salts, polymers, heavy metal cations, light metal cations, radioactive cations, and mixtures thereof.

16. The method according to claim 1, wherein at least one of the one or more additives of (iv) is a (bio-)polymer selected from polyhydroxybutyrate, polylactide, polybutylene succinate, polyacrylic acid, polymethacrylate, poly(2-hydroxyethylmethacrylate), polyvinyl alcohol, polyvinyl acetate, polyvinylpyrrolidone, poly(2-ethyl-2-oxazoline), polystyrene, polyamide, copolymers, polyamino acids, cellulose and derivatives thereof, starch and derivatives thereof, lignins and derivatives thereof, pectins and derivatives thereof, natural adhesives, chitin and derivatives thereof, chitosan and derivatives thereof, cyclodextrins and derivatives thereof, and dextrins and derivatives thereof.

17. The method according to claim 1, wherein at least one of the one or more additives of (iv) is a hydrogel former selected from xanthan gum, alginates, and agar agars.

18. The method according to claim 1, wherein at least one of the one or more additives of (iv) is an extracellular polymeric substance chosen from microbial exopolysaccharides.

19. The method according to claim 1, wherein at least one of the one or more additives of (iv) is a polysaccharide or extracellular polymeric substance comprising one or more of acetic acid, sucrose, glucose, fructose, and inulin.

20. The method according to claim 1, wherein at least one of the one or more additives of (iv) is a monomer of polysaccharides selected from lactose, sucrose, glucose, fructose, and inulin.

* * * * *